United States Patent
Tsuno et al.

(10) Patent No.: US 9,244,205 B2
(45) Date of Patent: Jan. 26, 2016

(54) HARD-COATED ANTIGLARE FILM, POLARIZING PLATE AND IMAGE DISPLAY INCLUDING THE SAME, METHOD FOR PRODUCING THE SAME, AND METHOD FOR EVALUATING THE SAME

(75) Inventors: Naoki Tsuno, Ibaraki (JP); Daisuke Hamamoto, Ibaraki (JP); Hiroki Kuramoto, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 12/900,002

(22) Filed: Oct. 7, 2010

(65) Prior Publication Data

US 2011/0080645 A1 Apr. 7, 2011

(30) Foreign Application Priority Data

Oct. 7, 2009 (JP) .................................. 2009-233939

(51) Int. Cl.
*G02B 13/20* (2006.01)
*G02B 5/02* (2006.01)
(Continued)

(52) U.S. Cl.
CPC ............ *G02B 5/0278* (2013.01); *C09D 7/1225* (2013.01); *C09D 7/1266* (2013.01); *C09D 7/1275* (2013.01); *C09D 133/12* (2013.01);
(Continued)

(58) Field of Classification Search
CPC ...... G02B 1/105; G02B 1/118; G02B 5/0221; G02B 5/0278; C09D 7/1225; C09D 7/1266; C09D 7/1275

USPC .......................................... 359/601–614, 599
See application file for complete search history.

(56) References Cited

U.S. PATENT DOCUMENTS 6,042,928 A * 3/2000 Suzuki et al. ................. 428/141
6,639,725 B2 * 10/2003 Masaki et al. ................ 359/599
(Continued)

FOREIGN PATENT DOCUMENTS

CN 1831071 A 9/2006
CN 101046520 A 10/2007
(Continued)

OTHER PUBLICATIONS

Korean Office Action, mail date of Aug. 9, 2013, in corresponding Korean Patent Application No. 10-2010-0084595.
(Continued)

*Primary Examiner* — Thong Nguyen
(74) *Attorney, Agent, or Firm* — Westerman, Hattori, Daniels & Adrian, LLP

(57) ABSTRACT

A hard-coated antiglare film that has superior antiglare properties, allow high definition to be provided even in the case of a low haze value, can prevent white blur in an oblique direction from occurring and, and can improve the depth of black in black display, as well as a polarizing plate, and the like. The hard-coated antiglare film includes a transparent plastic film substrate and a hard-coating antiglare layer containing fine particles, which is on at least one surface of the transparent plastic film substrate. The hard-coated antiglare film has a total haze value Ht in the range of 10% to 35%. The total haze value Ht and an internal haze value Hin satisfy a relationship of $0.5 \leq Hin/Ht \leq 0.9$. The surface of the hard-coating antiglare layer has an uneven shape and an arithmetic average surface roughness Ra in the range of 0.1 to 0.3 μm.

14 Claims, 11 Drawing Sheets

(51) Int. Cl.
  *C09D 7/12* (2006.01)
  *C09D 133/12* (2006.01)
  *G02B 1/10* (2015.01)
  *G02B 1/118* (2015.01)
  *C08K 3/22* (2006.01)
  *C08K 3/36* (2006.01)
  *C08K 9/08* (2006.01)
  *G02F 1/1335* (2006.01)

(52) U.S. Cl.
  CPC ............... *G02B 1/105* (2013.01); *G02B 1/118* (2013.01); *G02B 5/0221* (2013.01); *G02B 5/0268* (2013.01); *G02B 5/0294* (2013.01); *C08K 3/22* (2013.01); *C08K 3/36* (2013.01); *C08K 9/08* (2013.01); *G02F 1/133502* (2013.01)
  USPC ......................................... 359/599; 359/601

(56) References Cited

U.S. PATENT DOCUMENTS

| | | | |
|---|---|---|---|
| 7,604,358 B2* | 10/2009 | Ninomiya et al. | 359/601 |
| 7,848,021 B2* | 12/2010 | Asakura et al. | 359/599 |
| 8,215,780 B2* | 7/2012 | Tsuno et al. | 359/601 |
| 2005/0255291 A1 | 11/2005 | Iwata et al. | |
| 2007/0195431 A1 | 8/2007 | Asakura et al. | |
| 2007/0206283 A1 | 9/2007 | Ohtani et al. | |
| 2007/0242362 A1 | 10/2007 | Takada et al. | |
| 2007/0243370 A1 | 10/2007 | Wakizaka et al. | |
| 2008/0057228 A1 | 3/2008 | Horie et al. | |
| 2009/0051277 A1 | 2/2009 | Inoue et al. | |
| 2009/0086326 A1 | 4/2009 | Hamamoto et al. | |
| 2009/0147196 A1 | 6/2009 | Horie et al. | |
| 2009/0244710 A1 | 10/2009 | Tsuno et al. | |
| 2009/0268299 A1* | 10/2009 | Furui et al. | 359/601 |
| 2010/0003459 A1 | 1/2010 | Ohishi et al. | |
| 2011/0080644 A1* | 4/2011 | Hamamoto | C09D 5/006 359/599 |

FOREIGN PATENT DOCUMENTS

| | | | |
|---|---|---|---|
| JP | 2003-004903 A | 1/2003 | |
| JP | 2005-309392 A | 11/2005 | |
| JP | 2005-316413 A | 11/2005 | |
| JP | 2007-249191 A | 9/2007 | |
| JP | 2007-264113 A | 10/2007 | |
| JP | 4001320 B2 | 10/2007 | |
| JP | 2007-298974 A | 11/2007 | |
| JP | 2008-58723 A | 3/2008 | |
| JP | 2009-70815 A | 4/2009 | |
| JP | 2009-128488 A | 6/2009 | |
| KR | 10-2009-0104712 | 8/2011 | |
| WO | 2007/000856 A1 | 1/2007 | |
| WO | 2008020587 A1 | 2/2008 | |
| WO | 2008/093769 A1 | 8/2008 | |
| WO | 2009/119905 A1 | 10/2009 | |

OTHER PUBLICATIONS

Office Action dated Nov. 25, 2013, issued in corresponding Chinese application no. 201010501984.3, w/ partial English translation (7 pages).

Japanese Office Action dated Mar. 28, 2014, issued in corresponding Japanese Patent Application No. 2013-080018, w/ partial English translation (5 pages).

Taiwanese Office Action dated Jul. 30, 2014, issued in corresponding Taiwanese Application No. 099133848; w/ Partial English translation.(8 pages).

* cited by examiner

HARD-COATED ANTIGLARE FILM, POLARIZING PLATE AND IMAGE DISPLAY INCLUDING THE SAME, METHOD FOR PRODUCING THE SAME, AND METHOD FOR EVALUATING THE SAME

CROSS-REFERENCE TO RELATED APPLICATION

This application claims priority from Japanese Patent Application No. 2009-233939 filed on Oct. 7, 2009. The entire subject matter of the Japanese Patent Application is incorporated herein by reference.

BACKGROUND OF THE INVENTION

1. Field of the Invention

The present invention relates to a hard-coated antiglare film, a polarizing plate and an image display including the same, a method for producing the same, and a method for evaluating the same.

2. Description of Related Art

With technical improvements in recent years, liquid crystal displays (LCDs), plasma display panels (PDPs), electroluminescence displays (ELDs), and the like have been developed in addition to conventional cathode ray tube (CRT) displays as image displays and have been used in practical applications. Particularly, with technical innovations of LCDs with respect to, for example, wide viewing angles, high resolution, high response, and superior color reproduction, applications of LCDs are spreading from notebook personal computers (notebook PCs) and monitors to television sets. In an LCD, generally, a liquid crystal panel is used in which polarizing plates are disposed on both sides of a liquid crystal cell, respectively. Generally, in order to prevent scratches on the polarizing plate, the surface of the liquid crystal panel is subjected to hard coating treatment. For the hard coating treatment, a hard-coated film is often used. The hard-coated film is subjected to antiglare treatment to prevent a decrease in contrast due to a reflection of external light such as fluorescent light and sunlight as well as a reflection of an image at the surface of the liquid crystal panel. Particularly with an increase in size of the screens of image displays, the number of image displays equipped with hard-coated antiglare films is increasing.

Recently, in order to improve image quality, the number of high definition image displays with small pixel sizes and full HD (high definition)-capable image displays is increasing, and notebook PCs and monitors have the number of pixels of 140 ppi or more, and have high definition. In such high definition image displays, when a conventional hard-coated antiglare film is disposed, variations in brightness in pixels are emphasized which to cause a visible failure (a failure due to glare) and result in considerably deteriorated image quality. Conventionally, in order to produce an antiglare laminate that allows high definition to be provided, a method has been employed in which the haze value of the antiglare layer is increased to eliminate glare. However, this method has a problem in that the contrast is decreased considerably because light is scattered intensively at the panel surface. Furthermore, in the case where the surface unevenness is increased to improve antiglare properties, there is a problem in white blur in an oblique direction, that is, white blur is observed due to excessively intensive scattering of reflected light when the panel surface is viewed from the oblique direction. In the antiglare treatment, a method in which an uneven shape of the film surface is produced by adding, for example, inorganic or organic particles is used. Generally, although an improvement in antiglare properties and an improvement in contrast or white blur are considered to have a contradictory relationship, various proposals have been made to obtain both these properties. For example, it is being studied that aggregates with three-dimensional structures formed of the aforementioned particles are present in an antiglare layer (for instance, see JP2005-316413 A, JP2007-264113 A, and JP2007-249191 A). This, however, may cause scatter at the aggregates or may cause a fine pattern to appear in a hard-coated film. Furthermore, although a method that is effective in improving a part of properties has been proposed (for instance, see JP2003-4903 A, and JP4001320 B), a method that is effective in solving all the three problems described above has not been found.

SUMMARY OF THE INVENTION

The hard-coated antiglare film of the present invention includes: a transparent plastic film substrate; and a hard-coating antiglare layer containing fine particles, which is on at least one surface of the transparent plastic film substrate. The hard-coated antiglare film has a total haze value Ht in a range of 10% to 35%. The total haze value Ht and an internal haze value Hin satisfy a relationship expressed by the following formula (1). A surface of the hard-coating antiglare layer has an uneven shape and the following arithmetic average surface roughness Ra in a range of 0.1 to 0.3 μm. The hard-coated antiglare film includes: convexities that exceed a roughness mean line of a surface roughness profile; no convexities in which line segments of portions of the mean line that cross the convexities each have a length of 80 μm or longer; convexities that exceed a standard line that is in parallel with the mean line and is located at a height of 0.1 μm; and at least 50 convexities in which line segments of portions of the standard line that cross the convexities each have a length of 20 μm or shorter in a 4-mm long portion at an arbitrary location of the surface of the hard-coating antiglare layer.

$$0.5 \leq Hin/Ht \leq 0.9 \tag{1}$$

Total haze value Ht: a haze value (cloudiness) (%) of an entire hard-coated antiglare film, according to JIS K 7136 (2000 version).

Internal haze value Hin: a haze value (%) of the entire hard-coated antiglare film measured in the case where a surface of the hard-coated antiglare film is smooth.

Ra: an arithmetic average surface roughness (μm) defined in JIS B 0601 (1994 version).

The polarizing plate of the present invention includes a polarizer and the hard-coated antiglare film of the present invention.

The image display of the present invention includes the hard-coated antiglare film of the present invention.

The image display of the present invention includes the polarizing plate of the present invention.

The method for producing the hard-coated antiglare film of the present invention includes: providing fine particles, a material for forming a hard-coating layer, which contains the following component (A) and component (B), and a material for forming a hard-coating antiglare layer, which contains a solvent; forming a film by applying the material for forming a hard-coating antiglare layer onto at least one surface of a transparent plastic film substrate; and forming the hard-coating antiglare layer by curing the film. The fine particles are added in a range of 5 to 20 parts by weight per 100 parts by weight of the material for forming a hard-coating layer, a mixed solvent of butyl acetate and methyl ethyl ketone (MEK) is used as the solvent, and a ratio of butyl acetate to MEK in the mixed solvent is in a range of 1.5/1 to 6.0/1 as a weight ratio.

Component (A): a curable compound having at least one of an acrylate group and a methacrylate group.

Component (B): particles with a weight-average particle size of 200 nm or shorter, which are formed by binding between inorganic oxide particles and an organic compound having a polymerizable unsaturated group.

The method for producing the hard-coated antiglare film of the present invention includes: providing fine particles, a material for forming a hard-coating layer, which contains the following component (A) and component (B), and a material for forming a hard-coating antiglare layer, which contains a solvent; forming a film by applying the material for forming a hard-coating antiglare layer onto at least one surface of a transparent plastic film substrate; and forming a hard-coating antiglare layer by curing the film. The fine particles are added in a range of 5 to 20 parts by weight per 100 parts by weight of the material for forming a hard-coating layer. A mixed solvent of methyl isobutyl ketone (MIBK) and methyl ethyl ketone (MEK) is used as the solvent. A ratio of MIBK to MEK in the mixed solvent is in a range of 1.5/1 to 6.0/1 as a weight ratio.

Component (A): a curable compound having at least one of an acrylate group and a methacrylate group.

Component (B): particles with a weight-average particle size of 200 nm or shorter, which are formed by binding between inorganic oxide particles and an organic compound having a polymerizable unsaturated group.

The hard-coated antiglare film evaluating method of the present invention includes: evaluating visibility of a hard-coated antiglare film using: a total haze value Ht, an internal haze value Hin, and the following arithmetic average surface roughness Ra of a surface of the hard-coated antiglare film having an uneven shape, which are defined below; a size and the number of convexities that exceed a roughness mean line of a surface roughness profile in a 4-mm long portion at an arbitrary location of the surface of the hard-coated antiglare film; and a size and the number of convexities that exceed a standard line that is in parallel with the mean line and is located at a height of 0.1 μm, assuming that the total haze value Ht of the hard-coated antiglare film is in a range of 10% to 35%.

Total haze value Ht: a haze value (cloudiness) (%) of an entire hard-coated antiglare film, according to JIS K 7136 (2000 version).

Internal haze value Hin: a haze value (%) of the entire hard-coated antiglare film measured in the case where a surface of the hard-coated antiglare film is smooth.

Ra: an arithmetic average surface roughness (μm) defined in JIS B 0601(1994 version).

Since the hard-coated antiglare film of the present invention can improve the bright-dark contrast considerably as compared to conventional hard-coated antiglare films that allow higher definition to be provided, even in a liquid crystal panel with high definition having a resolution of, for instance, about 200 ppi, glare can be prevented from occurring and furthermore, the haze value also can be decreased. The hard-coated antiglare film of the present invention has superior antiglare properties by obtaining a characteristic uneven shape and can prevent white blur in an oblique direction from occurring. Since prevention of the white blur allows light to be prevented from being scattered in the front direction of an image display, the black brightness is suppressed and thereby the contrast in a bright place can be improved. This makes it possible to increase the depth of black in black display of an image display. Accordingly, an image display including a hard-coated antiglare film or a polarizing plate of the present invention has superior display properties.

BRIEF DESCRIPTION OF THE DRAWINGS

FIG. 1(a) is a diagram showing a profile, which indicates a range of 0 to 1 mm out of a measured length of 4 mm, of a sectional surface shape of a hard-coated antiglare film according to Example 1.

FIG. 1(b) is a diagram showing a profile, which indicates a range of 1 to 2 mm out of a measured length of 4 mm, of the sectional surface shape of the hard-coated antiglare film according to Example 1.

In FIGS. 14 and 15, 1 is a transparent plastic film substrate, 2 is a hard-coating antiglare layer containing a fine particles 3, 5 is an antireflection layer, 4 and 6 are a hard-coating antiglare films and P is a polarizer.

DETAILED DESCRIPTION OF THE INVENTION

Figure 1:
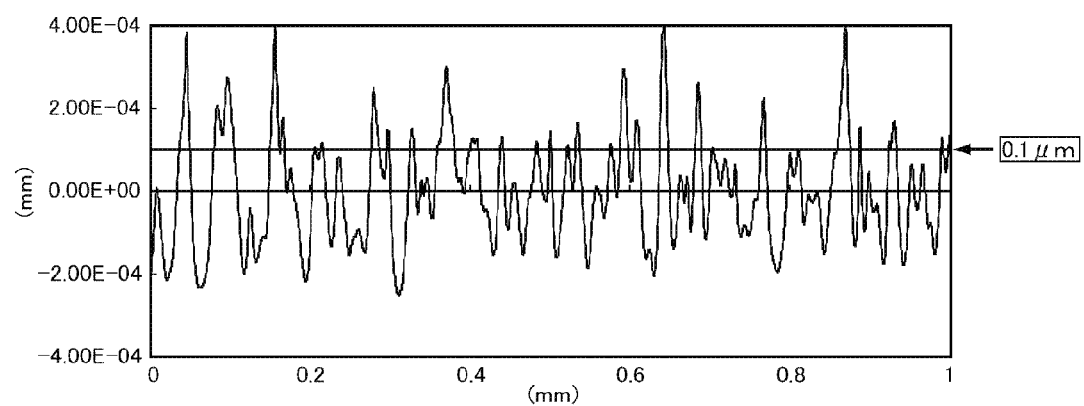
Figure 1:
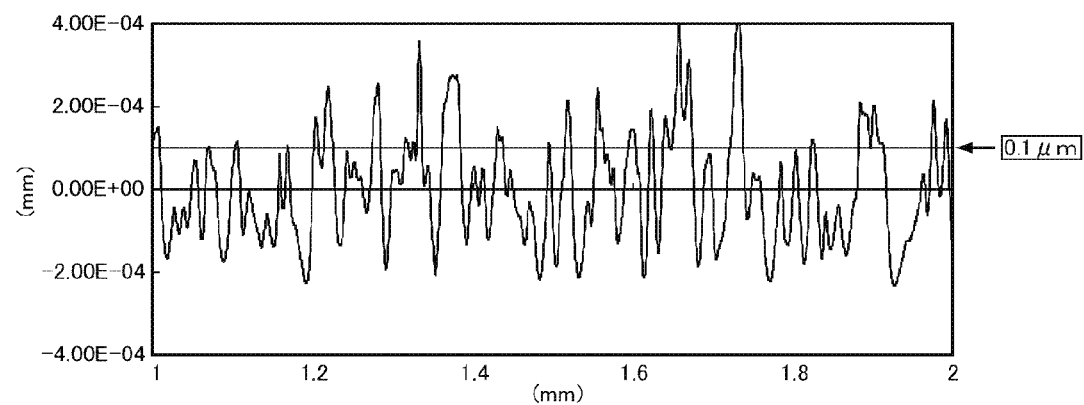
Figure 1C:
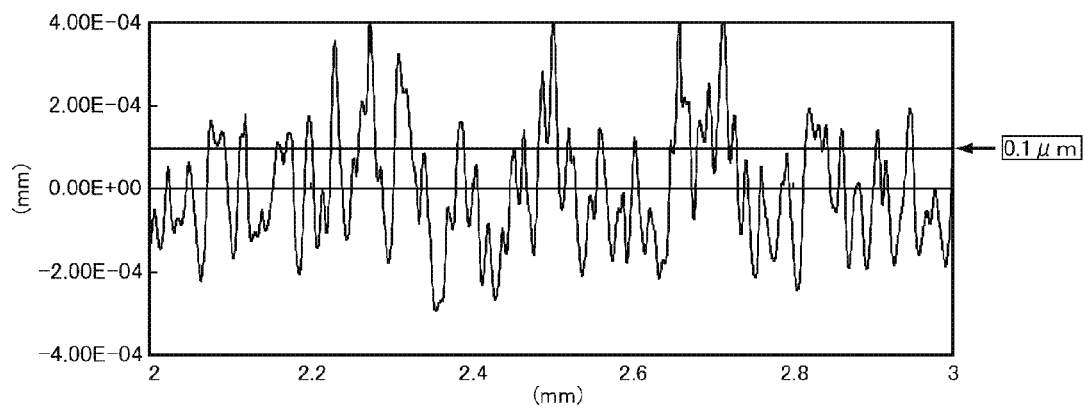
FIG. 1(c) is a diagram showing a profile, which indicates a range of 2 to 3 mm out of a measured length of 4 mm, of the sectional surface shape of the hard-coated antiglare film according to Example 1.
Figure 1D:
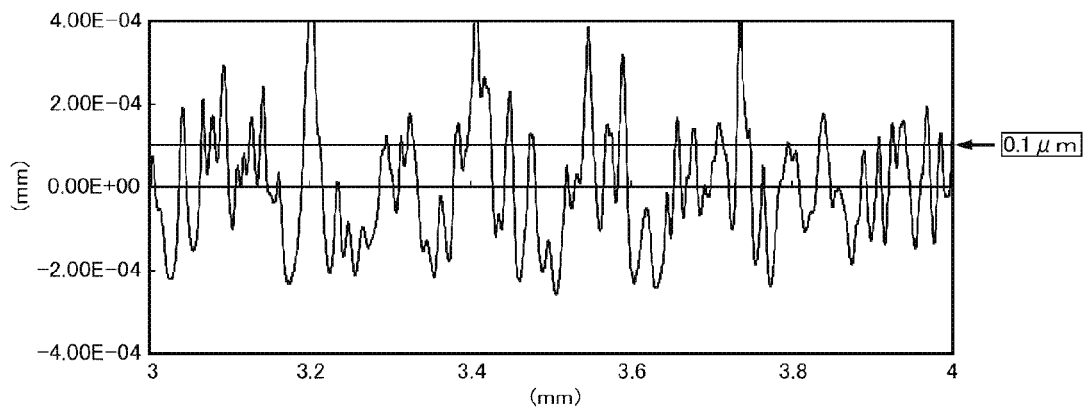
FIG. 1(d) is a diagram showing a profile, which indicates a range of 3 to 4 mm out of a measured length of 4 mm, of the sectional surface shape of the hard-coated antiglare film according to Example 1.
Figure 2:
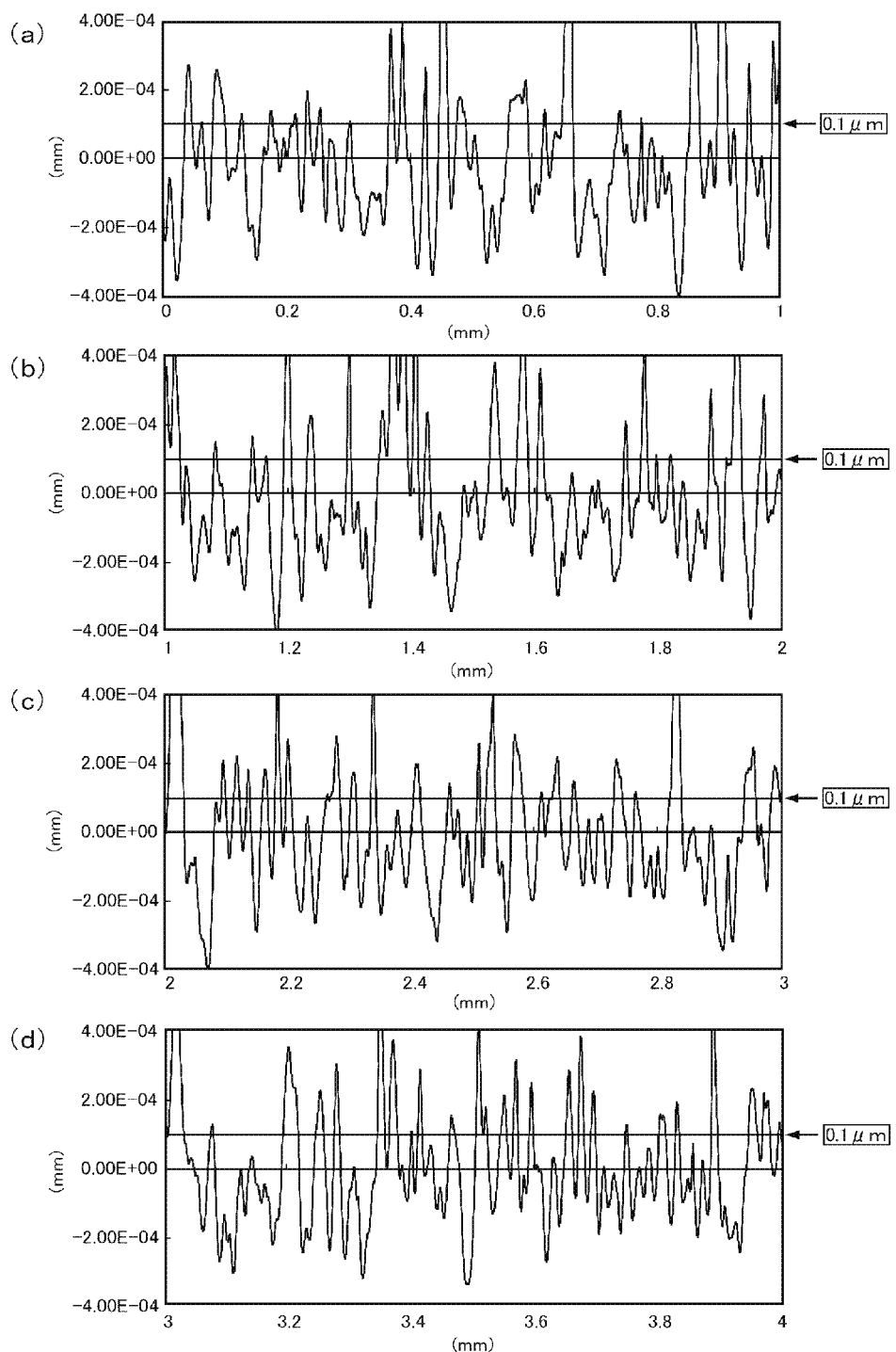
FIGS. 2(a) to (d) are diagrams showing profiles that indicate a measured length of 4 mm of a sectional surface shape of a hard-coated antiglare film according to Example 2; (a) a range of 0 to 1 mm, (b) a range of 1 to 2 mm, (c) a range of 2 to 3 mm, and (d) a range of 3 to 4 mm.
Figure 3:
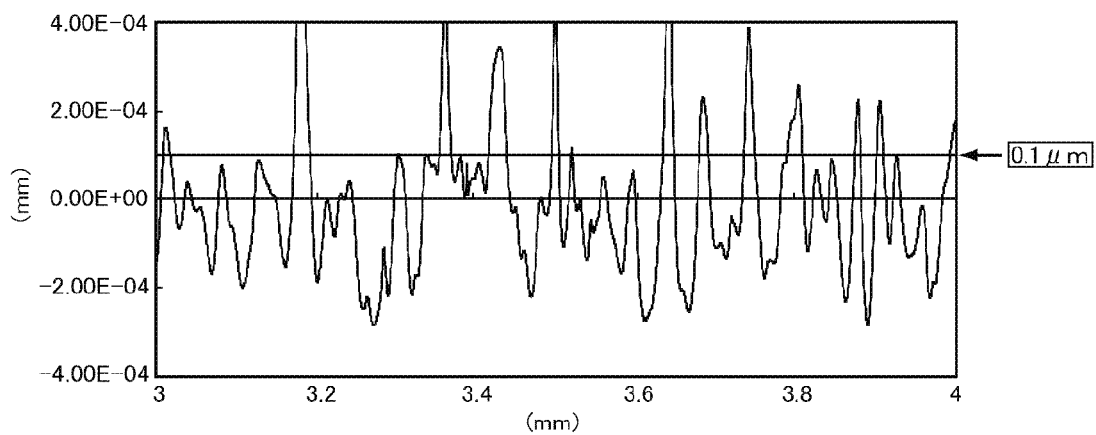
FIG. 3 is a diagram showing a profile that indicates a range of 3 to 4 mm out of a measured length of 4 mm of a sectional surface shape of a hard-coated antiglare film according to Comparative Example 1.
Figure 4:
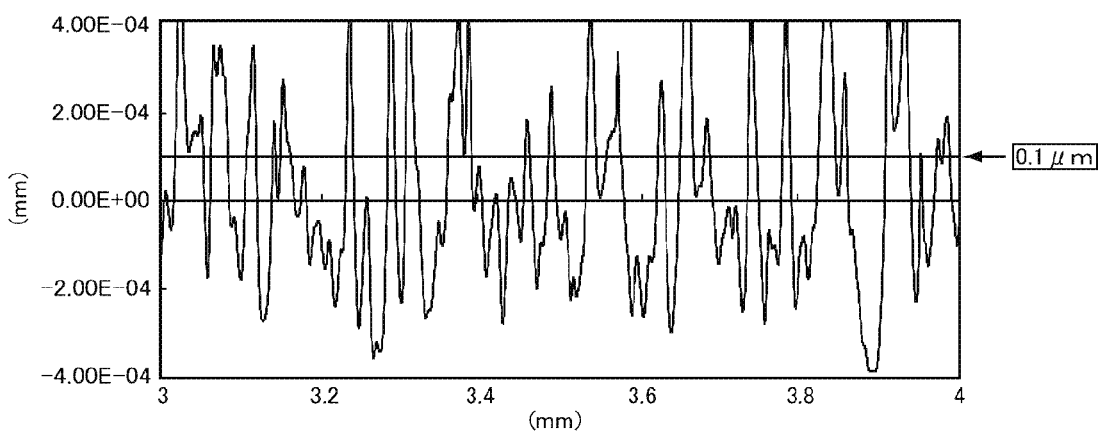
FIG. 4 is a diagram showing a profile that indicates a range of 3 to 4 mm out of a measured length of 4 mm of a sectional surface shape of a hard-coated antiglare film according to Comparative Example 2.
Figure 5:
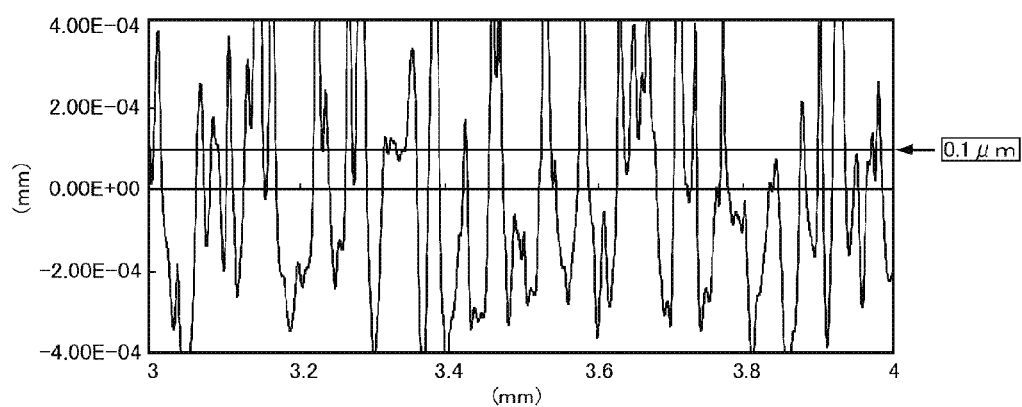
FIG. 5 is a diagram showing a profile that indicates a range of 3 to 4 mm out of a measured length of 4 mm of a sectional surface shape of a hard-coated antiglare film according to Comparative Example 3.
Figure 6:
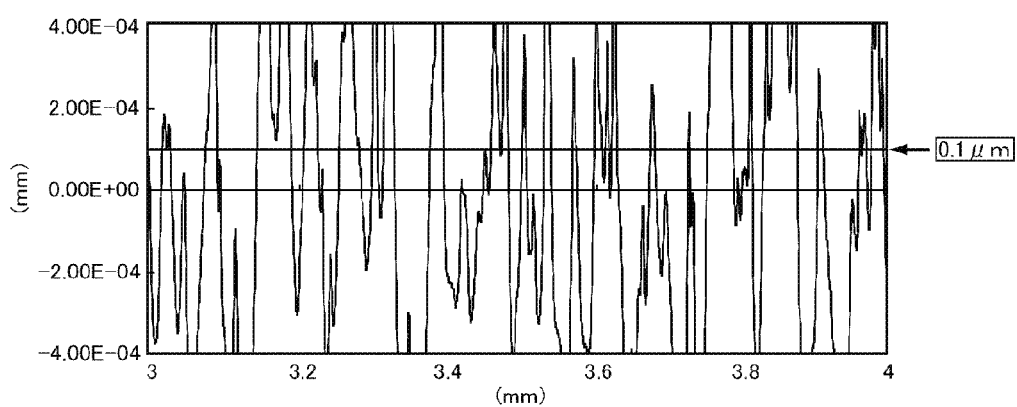
FIG. 6 is a diagram showing a profile that indicates a range of 3 to 4 mm out of a measured length of 4 mm of a sectional surface shape of a hard-coated antiglare film according to Comparative Example 4.
Figure 7:
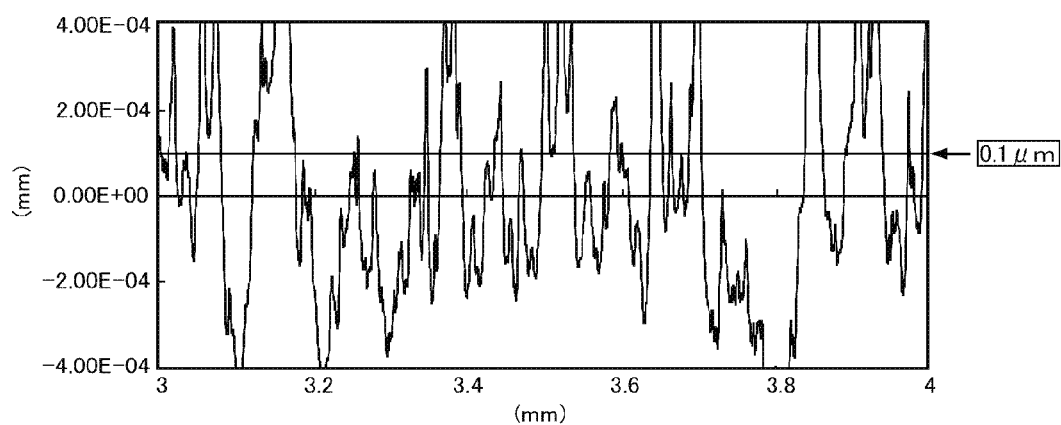
FIG. 7 is a diagram showing a profile that indicates a range of 3 to 4 mm out of a measured length of 4 mm of a sectional surface shape of a hard-coated antiglare film according to Comparative Example 5.
Figure 8:
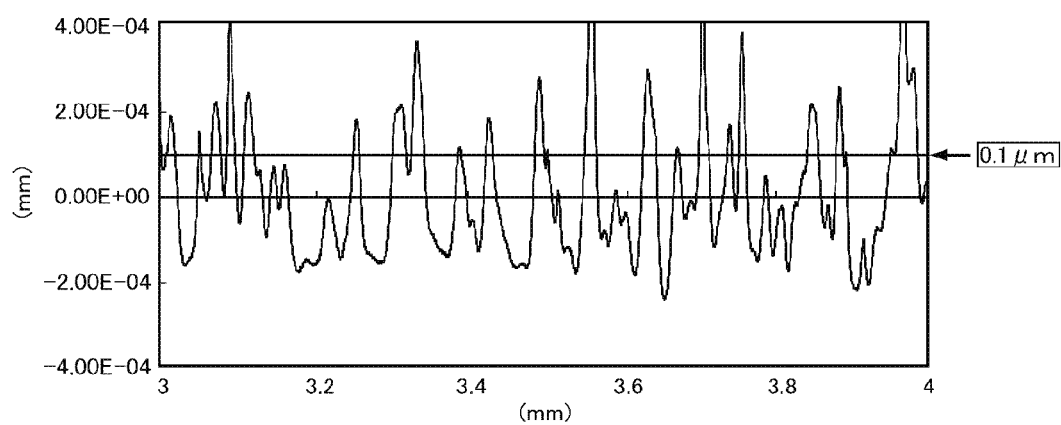
FIG. 8 is a diagram showing a profile that indicates a range of 3 to 4 mm out of a measured length of 4 mm of a sectional surface shape of a hard-coated antiglare film according to Comparative Example 6.
Figure 9:
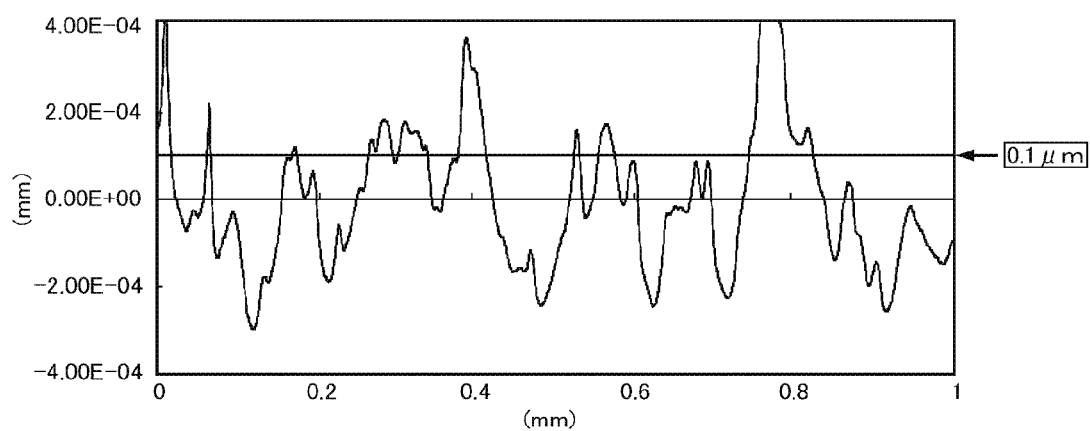
FIG. 9 is a diagram showing a profile that indicates a range of 0 to 1 mm out of a measured length of 4 mm of a sectional surface shape of a hard-coated antiglare film according to Comparative Example 7.
Figure 10:
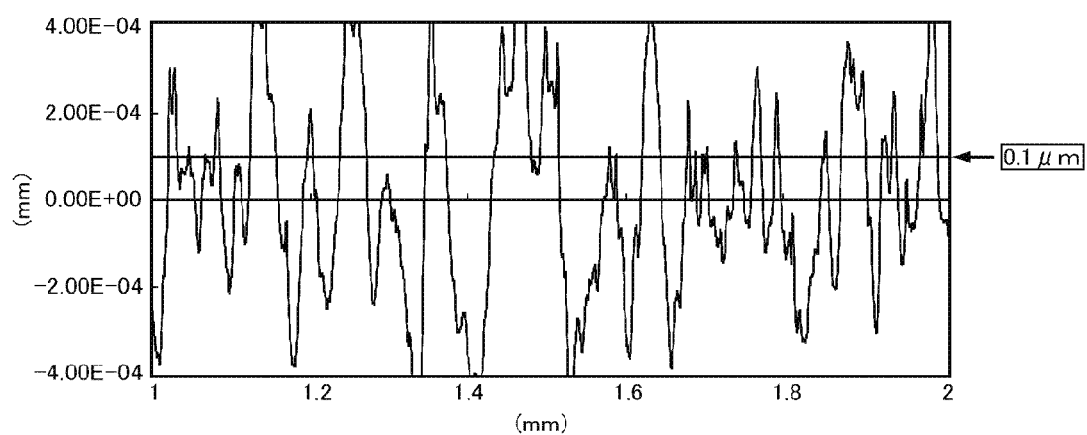
FIG. 10 is a diagram showing a profile that indicates a range of 1 to 2 mm out of a measured length of 4 mm of a sectional surface shape of a hard-coated antiglare film according to Comparative Example 8.
Figure 11:
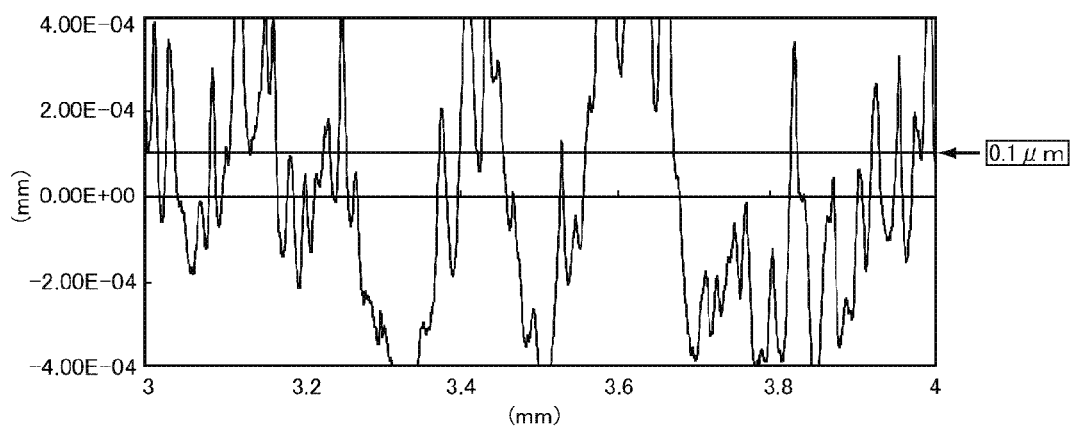
FIG. 11 is a diagram showing a profile that indicates a range of 3 to 4 mm out of a measured length of 4 mm of a sectional surface shape of a hard-coated antiglare film according to Comparative Example 9.

Preferably, in the hard-coated antiglare film of the present invention, the hard-coating antiglare layer is formed using the fine particles and a material for forming a hard-coating layer, which contains the following components (A) and (B):

the component (A): a curable compound having at least one of an acrylate group and a methacrylate group, and the component (B): particles having a weight-average particle size of 200 nm or shorter, which are formed by binding between inorganic oxide particles and an organic compound having a polymerizable unsaturated group.

Preferably, in the component (B), the inorganic oxide particles include particles of at least one type selected from the group consisting of silicon oxide, titanium oxide, aluminum oxide, zinc oxide, tin oxide, and zirconium oxide.

Preferably, the material for forming a hard-coating layer contains the component (B) in the range of 100 to 200 parts by weight per 100 parts by weight of the component (A).

Preferably, the difference in refractive index between the material for forming a hard-coating layer and the fine particles is in the range of 0.01 to 0.04, at least one type of spherical and amorphous fine particles, each of which have a weight average particle size in the range of 0.5 to 8 μm, are contained as the fine particles, and the fine particles are contained in the range of 5 to 20 parts by weight per 100 parts by weight of the material for forming a hard-coating layer.

Preferably, in the hard-coated antiglare film of the present invention, the hard-coating antiglare layer has a thickness in a range that is 1.2 to 3 times the weight average particle size of the fine particles.

Preferably, the hard-coated antiglare film of the present invention further includes an antireflection layer formed on the hard-coating antiglare layer.

Preferably, in the hard-coated antiglare film evaluating method of the present invention, the hard-coated antiglare film is evaluated as acceptable when the Ht and the Hin satisfy a relationship expressed by the following formula (1), the Ra is in a range of 0.1 to 0.3 μm, the hard-coated antiglare film includes no convexities in which line segments of portions of the mean line that cross the convexities each have a length of 80 μm or longer, and includes at least 50 convexities in which line segments of portions of the standard line that cross the convexities each have a length of 20 μm or shorter.

$$0.5 \leq Hin/Ht \leq 0.9 \quad (1)$$

Next, the present invention is described in detail. The present invention, however, is not limited by the following description.

The hard-coated antiglare film of the present invention includes a transparent plastic film substrate and a hard-coating antiglare layer that is on at least one surface of the transparent plastic film substrate.

The transparent plastic film substrate is not particularly limited. Preferably, the transparent plastic film substrate has a high visible light transmittance (preferably a light transmittance of at least 90%) and superior transparency (preferably a haze value of 1% or lower). Examples of the transparent plastic film substrate include those described in JP 2008-90263 A. As the transparent plastic film substrate, those having small optical birefringence are used suitably. The hard-coated antiglare film of the present invention can be used, for example, as a protective film for a polarizing plate. In this case, the transparent plastic film substrate preferably is a film formed of triacetyl cellulose (TAC), polycarbonate, an acrylic polymer, or a polyolefin having a cyclic or norbornene structure. In the present invention, as described below, the transparent plastic film substrate may be a polarizer itself. Such a structure does not need a protective layer formed of, for example, TAC and simplifies the structure of the polarizing plate. Accordingly, such a structure makes it possible to reduce the number of steps for producing polarizing plates or image displays and to increase production efficiency. In addition, such a structure allows polarizing plates to be formed of thinner layers. When the transparent plastic film substrate is a polarizer, the hard-coating antiglare layer serves as a conventional protective layer. In such a structure, the hard-coated antiglare film also functions as a cover plate in a case where it is attached to the surface of a liquid crystal cell, for example.

In the present invention, the thickness of the transparent plastic film substrate is not particularly limited. For example, the thickness is preferably 10 to 500 μm, more preferably 20 to 300 μm, and most suitably 30 to 200 μm, with consideration given to strength, workability such as handling properties, and thin layer properties. The refractive index of the transparent plastic film substrate is not particularly limited. The refractive index is, for example, in the range of 1.30 to 1.80, preferably in the range of 1.40 to 1.70.

The hard-coating antiglare layer is formed using the fine particles and the material for forming a hard-coating layer. Examples of the material for forming a hard-coating layer include thermosetting resins and ionizing radiation curable resins that are cured with ultraviolet rays or light. It also is possible to use, for example, a commercially available thermosetting resin or an ultraviolet curable resin as the material for forming a hard-coating layer. Preferably, however, the material for forming a hard-coating layer contains, for example, the following components (A) and (B).

Component (A): a curable compound having at least one of an acrylate group and a methacrylate group.

Compound (B): particles having a weight-average particle size of 200 nm or shorter, which are formed by binding between inorganic oxide particles and an organic compound having a polymerizable unsaturated group.

A curable compound having at least one of an acrylate group and a methacrylate group, which is cured by, for example, heat, light (for instance, ultraviolet light), or an electron beam can be used as the component (A). Examples of the component (A) include silicone resins, polyester resins, polyether resins, epoxy resins, urethane resins, alkyd resins, spiroacetal resins, polybutadiene resins, polythiolpolyene resins, and an oligomer or a prepolymer of, for example, acrylate or methacrylate of a polyfunctional compound such as polyhydric alcohol. These may be used alone or in a combination of two or more of them.

For example, a reactive diluent having at least one of an acrylate group and a methacrylate group also can be used as the component (A). As the reactive diluent, for example, those described in JP 2008-88309 A can be used. Examples of the reactive diluent include monofunctional acrylate, monofunctional methacrylate, polyfunctional acrylate, and polyfunctional methacrylate. The reactive diluent preferably is trifunctional or higher-functional acrylate, or trifunctional or higher-functional methacrylate. This is because it allows the hard-coating antiglare layer to have higher hardness. Examples of the component (A) include butanediol glycerol ether diacrylate, isocyanurate acrylate, and isocyanurate methacrylate. For the component (A), one type can be used independently, or two types or more can be used in combination.

The component (B) is as described above. In the component (B), the inorganic oxide particles can be fine particles of, for example, silicon oxide (silica), titanium oxide, aluminum oxide, zinc oxide, tin oxide, or zirconium oxide. Particularly, fine particles of silicon oxide (silica), titanium oxide, aluminum oxide, zinc oxide, tin oxide, and zirconium oxide are preferable. These may be used alone or in a combination of two or more of them.

In the hard-coated antiglare film of the present invention, in terms of prevention of scattering of light, prevention of a decrease in transmittance of a hard-coating layer, prevention of coloring, and transparency, the component (B) preferably is nanoparticles whose weight average particle size is in the range of 1 to 200 nm. The weight average particle size can be measured by the method described below in the examples, for example. The weight average particle size more preferably is in the range of 1 to 100 nm. The inventors found out that when the component (B), nanoparticles, was added to the component (A), the movement of the fine particles was changed during applying and drying steps according to, for example, the selection of the solvent described later. In other words, in a system including nanoparticles added thereto, surface unevenness tended not to be formed by the fine particles when a particular solvent was used, while the unevenness tended to be formed when another particular solvent was used. When the nanoparticles were not contained, the uneven surface shape did not differ significantly according to the type of the solvent. With consideration given to these phenomena, it can be presumed that since repulsive force is imposed on nanoparticles and fine particles when the nanoparticles are contained, the fine particles tend to be dispersed relatively uniformly, and the movement of the fine particles can be controlled easily during the applying and drying steps, and therefore, the number of parts of the fine particles to be added can be reduced and the uneven surface shape of the present invention can be produced effectively. However, the present invention is neither limited nor restricted by this presumption.

In the component (B), the inorganic oxide particles are bound (surface-modified) with an organic compound having a polymerizable unsaturated group. The polymerizable unsaturated group is reacted with the component (A) to be cured, which results in an increase in hardness of the hard-coating layer. Preferable examples of the polymerizable unsaturated group include an acryloyl group, a methacryloyl group, a vinyl group, a propenyl group, a butadienyl group, a styryl group, an ethynyl group, a cinnamoyl group, a maleate group, and an acrylamide group. The organic compound having the polymerizable unsaturated group preferably is a compound having a silanol group inside a molecule or a compound that produces a silanol group through hydrolysis. It also is preferable that the organic compound having the polymerizable unsaturated group be one containing a photosensitive group.

The amount of the component (B) to be added is preferably in the range of 100 to 200 parts by weight per 100 parts by weight of the component (A). When the amount of the component (B) to be added is 100 parts by weight or more, the hard-coated antiglare film can be prevented more effectively from curling and bending. When the amount is 200 parts by weight or less, high scratch resistance and pencil hardness can be obtained. The amount of the component (B) to be added is more preferably in the range of 100 to 150 parts by weight per 100 parts by weight of the component (A).

Adjustment in the amount of the component (B) to be added allows, for example, the refractive index of the hard-coating antiglare layer to be controlled. In the case where the antireflection layer to be described below is not provided, it is advantageous that the hard-coating antiglare layer is allowed to have a lower refractive index in order to reduce the reflectance. In the case where an antireflection layer (low refractive index layer) is provided, it is possible to uniformly reduce the reflection of light in a visible light wavelength range by increasing the refractive index of the hard-coating antiglare layer.

The fine particles for forming the hard-coating antiglare layer have main functions of providing it with antiglare properties by forming the surface of the hard-coating antiglare layer to be formed into an uneven shape and controlling the haze value of the hard-coating antiglare layer. Controlling the difference in refractive index between the fine particles and the material for forming a hard-coating layer allows the haze value of the hard-coating antiglare layer to be designed. Examples of the fine particles include inorganic fine particles and organic fine particles. The inorganic fine particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. The organic fine particles are not particularly limited. Examples thereof include polymethyl methacrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. With respect to these inorganic fine particles and organic fine particles, one of them may be used independently or two or more of them may be used in combination.

The weight average particle size of the fine particles preferably is in the range of 0.5 to 8 µm. When the weight average particle size of the fine particles exceeds the aforementioned range, the image sharpness is reduced. On the other hand, when it is shorter than the aforementioned range, sufficient antiglare properties cannot be obtained and thereby a problem of increased glare tends to arise. The weight average particle size of the fine particles is more preferably in the range of 2 to 6 µm, yet more preferably in the range of 3 to 6 µm. Furthermore, it also is preferable that the weight average particle size of the fine particles be in the range of 30% to 80% of the thickness of the hard-coating antiglare layer. The weight average particle size of the fine particles can be measured by the Coulter counting method. For instance, a particle size distribution measurement apparatus (Coulter Multisizer (product name), manufactured by Beckman Coulter, Inc.) using a pore electrical resistance method is used to measure an electrical resistance of an electrolyte corresponding to the volume of the fine particles when the fine particles pass through the pores. Thus, the number and volume of the fine particles are measured and then the weight average particle size is calculated.

The shape of the fine particles is not particularly limited. For instance, they can have a bead-like, substantially spherical shape or can have an indeterminate shape like powder. However, the fine particles preferably have a substantially spherical shape, more preferably a substantially spherical shape with an aspect ratio of 1.5 or lower, and most preferably a spherical shape.

The ratio of the fine particles to be added is preferably in the range of 5 to 20 parts by weight and more preferably in the range of 10 to 20 parts by weight, per 100 parts by weight of the material for forming a hard-coating layer.

The thickness of the hard-coating antiglare layer is preferably in the range that is 1.2 to 3 times and more preferably 1.2 to 2 times the weight average particle size of the fine particles. Furthermore, from the viewpoints of applying properties and pencil hardness, the thickness of the hard-coating antiglare layer preferably is in the range of 8 to 12 µm, and it is preferable that the weight average particle size of the fine particles be adjusted so that the thickness is in this thickness range. The thickness in the predetermined range makes it easy to obtain the surface shape of the hard-coated antiglare film of the present invention, in which a large number of fine concavities and convexities are present independently, and sufficiently high hardness (for instance, a pencil hardness of at least 4H) of the hard-coating antiglare layer. Furthermore, the thickness exceeding the above-mentioned range causes problems in that the hard-coated antiglare film curls considerably to have deteriorated line traveling performance during the applying and further in that antiglare properties are deteriorated. On the other hand, when the thickness is less than the predetermined range described above, there is a problem in that glare cannot be prevented from occurring and thereby the sharpness deteriorates.

The hard-coated antiglare film of the present invention has a total haze value Ht in the range of 10% to 35%. The total haze value is a haze value (cloudiness) of the entire hard-coated antiglare film according to JIS K 7136 (2000 version). The total haze value is more preferably in the range of 15% to 30%, yet more preferably in the range of 20% to 25%. In order to obtain the total haze value in the aforementioned range, it is preferable that the fine particles and the material for forming a hard-coating layer be selected so that the difference in refractive index between the fine particles and the material for forming a hard-coating layer is in the range of 0.01 to 0.04. The total haze value in the aforementioned range allows a clear image to be obtained and can improve the contrast in a dark place. When the total haze value is excessively low, a failure due to glare tends to occur.

Further, in the hard-coated antiglare film of the present invention, a total haze value Ht and an internal haze value Hin satisfy a relationship expressed by 0.5≤Hin/Ht≤0.9. The internal haze value Hin is a haze value of entire hard-coated antiglare film, measured in the case where the surface of the hard-coated antiglare film is smooth. In order to form the smooth surface, the material for forming a hard-coating layer may be applied onto the surface of the hard-coated antiglare film, for example. By forming the smooth surface and measuring the haze value, the haze value (the internal haze value) in which an influence of a surface scattering component is subtracted can be obtained. The Hin/Ht being 0 means that the internal haze value is 0, and shows the state where all of the haze is an external haze (a surface haze). In this case, generally, surface unevenness is large and glare occurs. On the other hand, the Hin/Ht being 1 shows the state where the internal haze value is 1. In this case, the external haze value (the surface haze value) is 0, i.e., generally, the surface is smooth and antiglare properties cannot be obtained. The Hin/Ht is preferably in the range of 0.5 to 0.7, more preferably in the range of 0.5 to 0.6. When the Hin/Ht is less than 0.5, glare tends to occur. On the other hand, when it exceeds 0.9, sufficient antiglare properties cannot be provided.

In the hard-coated antiglare film of the present invention, the surface of the hard-coating antiglare layer has an uneven shape and an arithmetic average surface roughness Ra that is defined in JIS B 0601 (1994 version) in the range of 0.1 to 0.3 µm. The hard-coated antiglare film of the present invention includes convexities that exceed a roughness mean line of a surface roughness profile; no convexities in which line segments of portions of the mean line that cross the convexities each have length of 80 µm or longer; convexities that exceed a standard line that is in parallel with the mean line and is located at a height of 0.1 µm; and at least 50 convexities in which line segments of portions of the standard line that cross the convexities each have a length of 20 µm or shorter in a 4-mm long portion at an arbitrary location of the surface of the hard-coating antiglare layer. The Ra is more preferably in the range of 0.1 to 0.2 µm, yet more preferably in the range of 0.1 to 0.15 µm. In order to prevent reflections of an image and outside light at the surface of the hard-coated antiglare film, a certain degree of surface roughness is required and an Ra of 0.1 µm or more allows the reflections to be reduced. Furthermore, in order to prevent white blur from occurring, an Ra of 0.3 µm or less is required and further it is advantageous not to have roughness in the entire surface but to have an uneven shape of the surface such as one having undulation or fine concavities and convexities sparsely. A lower number of convexities in which the line segments each have a length of 20 µm or shorter is not preferable in terms of antiglare properties and also tend to cause glare to occur. The number of convexities in which the line segments each have a length of 20 µm or shorter is preferably in the range of 60 to 100, more preferably in the range of 80 to 100. When the number of the convexities is less than 50, glare tends to occur. On the other hand, when it exceeds 100, white blur tends to become intensive. The presence of convexities in which the line segments each have a length of 80 µm or longer tends to cause glare to occur. In the case of a hard-coated antiglare film including no convexities in which the line segments each have a length of 80 µm or longer, including at least 50 convexities in which the line segments each have a length of 20 µm or shorter, and having the Ra in the range of 0.1 to 0.3 µm, the presence of the large number of relatively uniform fine concavities and convexities allows scattering to occur uniformly in an superior manner and glare can be prevented from occurring even in a high definition panel. Further, the reflected light can be prevented from scattering when viewed from an oblique direction, which results in a reduction in white blur and also in an improvement in contrast in a bright place.

As is defined by the Ra and the size and number of the convexities, the hard-coated antiglare film of the present invention includes the large number of independent fine concavities and convexities, includes no convexities in which the line segments each have a length of 80 µm or longer, and includes a predetermined number of independent fine concavities and convexities, and further has inner scatter defined by the haze value in the aforementioned range, which allows both the improvement in antiglare properties and elimination of glare to be obtained.

The hard-coated antiglare film of the present invention can be produced as follows. That is, for example, a material for forming a hard-coating antiglare layer is prepared from the fine particles, the material for forming a hard-coating layer, and a solvent, the material for forming a hard-coating antiglare layer is applied onto at least one surface of the transparent plastic film substrate to form a film (hereinafter referred to as a "applied film"), and the applied film is then cured to form the hard-coating antiglare layer. In the production of the hard-coated antiglare film of the present invention, it also is possible to use, for example, a transfer method using a mold and a method for providing an uneven shape by a suitable method such as sandblast or embossing roll, in combination.

The solvent is not particularly limited, various solvents can be used, and the solvents may be used alone or in a combination of two or more of them. There are the type of the solvent and the solvent ratio that are optimal to obtain the hard-coating antiglare film of the present invention depending on the composition of a material for forming a hard-coating layer, the type of fine particles and the content of the same.

For example, when 10 parts by weight of fine particles are added to each material for forming a hard-coating layer that was used in the examples described below, thereby the solid concentration is 45% by weight, and the thickness of the hard-coating antiglare layer is about 10 µm, a hard-coated antiglare film having the properties of the present invention can be obtained in which the ratio of methyl isobutyl ketone (MIBK)/methyl ethyl ketone (MEK) is in the range of at least 1.5/1 to 6.0/1 (weight ratio). The ratio of MIBK/MEK preferably is in the range of 1.5/1 to 3.0/1 (weight ratio). In the case of butyl acetate/MEK, a hard-coated antiglare film having the properties of the present invention can be obtained in which the ratio of butyl acetate/MEK is in the range of at least 1.5/1 to 6.0/1 (weight ratio). The ratio of butyl acetate/MEK is more preferably in the range of 3.0/1 to 5.5/1 (weight ratio). When the ratio is less than 1.5/1, the number of concavities and convexities at the surface is increased, but white blur and surface unevenness tend to occur. When the ratio is more than 6.0/1, the number of concavities and convexities at the surface is decreased, and glare tends to occur. As in the case of the materials for forming a hard-coating layer that were used in the examples described below, when the component (B) is nanoparticles, it is presumed that the dispersed state of the nanoparticles and the fine particles is changed according to, for instance, the type and mixing ratio of the solvent, which results in a change in tendency of concavities and convexities at the surface of the hard-coating antiglare layer. However, the present invention is neither limited nor restricted by this presumption. In the case of, for example, the materials for forming a hard-coating layer described below, concavities and convexities tend to be formed at the surface when the solvent is, for example, MEK, cyclopentanone, ethyl acetate, or acetone, while concavities and convexities tend not to be formed at the surface when the solvent is, for example, MIBK, toluene, butyl acetate, 2-propanol, or ethanol. Accordingly, in order to obtain a hard-coated antiglare film having the properties of the present invention, it also is preferable that the surface shape be controlled through selection of the type and ratio of the solvent.

Various types of leveling agents can be added to the material for forming a hard-coating antiglare layer. The leveling agent may be, for example, a fluorine or silicone leveling agent, preferably a silicone leveling agent. As the silicone leveling agent, the reactive silicone is particularly preferable. Addition of the reactive silicone can impart lubricity to the surface and maintain scratch resistance over a long period of time. In the case of using a reactive silicone having a hydroxyl group, as described below, when an antireflection layer (a low refractive index layer) containing a siloxane component is formed on the hard-coating antiglare layer, the adhesion between the antireflection layer and the hard-coating antiglare layer is improved.

The amount of the leveling agent to be added can be, for example, 5 parts by weight or less, preferably in the range of 0.01 to 5 parts by weight, per 100 parts by weight of entire resin components.

The material for forming a hard-coating antiglare layer may contain, for example, a pigment, a filler, a dispersing agent, a plasticizer, an ultraviolet absorbing agent, a surfactant, an antifoulant, an antioxidant, or a thixotropy-imparting agent, as long as the performance is not impaired, if necessary. These additives may be used alone or in a combination of two or more of them.

In the material for forming a hard-coating antiglare layer, any known photopolymerization initiator such as those described in JP 2008-88309 A can be used.

Examples of the method for applying the material for forming a hard-coating antiglare layer onto the transparent plastic film substrate include applying methods such as fountain coating, die coating, spin coating, spray coating, gravure coating, roll coating, and bar coating.

The material for forming a hard-coating antiglare layer is applied to form an applied film onto the transparent plastic film substrate and then the applied film is cured. Preferably, the applied film is dried before being cured. The drying can be carried out by, for example, allowing it to stand, air drying by blowing air, drying by heating, or a combination thereof.

The method for curing the applied film formed of the material for forming a hard-coating antiglare layer is not particularly limited but is preferably ultraviolet curing. The amount of irradiation with the energy radiation source is preferably 50 to 500 mJ/cm$^2$ in terms of accumulative exposure at an ultraviolet wavelength of 365 nm. When the amount of irradiation is at least 50 mJ/cm$^2$, the applied film can be cured more sufficiently and the resultant hard-coating antiglare layer also has a further sufficiently high hardness. When the amount of irradiation is 500 mJ/cm$^2$ or lower, the resultant hard-coating antiglare layer can be prevented from being colored.

As described above, the hard-coated antiglare film of the present invention can be produced by forming the hard-coating antiglare layer on at least one surface of the transparent plastic film substrate. The hard-coated antiglare film of the present invention can be produced by producing methods other than that described above. The hard-coated antiglare film of the present invention can have, for example, a hardness of at least 2H in terms of pencil hardness, although it is affected by the thickness of the layer.

An example of the hard-coated antiglare film of the present invention is one with a hard-coating antiglare layer formed on one surface of a transparent plastic film substrate. The hard-coating antiglare layer contains fine particles and thereby the surface of the hard-coating antiglare layer has an uneven shape. In this example, the hard-coating antiglare layer is formed on one surface of the transparent plastic film substrate, but the present invention is not limited thereto. It may be a hard-coated antiglare film with hard-coating antiglare layers formed on both surfaces of the transparent plastic film substrate. Furthermore, the hard-coating antiglare layer of this example is a monolayer, but the present invention is not limited thereto. The hard-coating antiglare layer may have a multilayer structure in which at least two layers are stacked together.

In the hard-coated antiglare film of the present invention, an antireflection layer (low refractive index layer) may be disposed on the hard-coating antiglare layer. For example, a light reflection at the interface between air and the hard-coating antiglare layer is one of the factors that cause a reduction in visibility of images when an image display is equipped with the hard-coated antiglare film. The antireflection layer reduces the surface reflection. The hard-coating antiglare layers and the antireflection layers may be formed on both surfaces of the transparent plastic film substrate, respectively.

Furthermore, the hard-coating antiglare layer and the antireflection layer each may have a multilayer structure in which at least two layers are stacked together.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out by using the effect of interference of light. The wavelength range of visible light that allows the antireflection function to be produced is, for example, 380 to 780 nm, and the wavelength range in which the visibility is particularly high is in the range of 450 to 650 nm. Preferably, the antireflection layer is designed to have a minimum reflectance at the center wavelength 550 nm of the range.

When the antireflection layer is designed based on the effect of interference of light, the interference effect can be enhanced by, for example, a method of increasing the difference in refractive index between the antireflection layer and the hard-coating antiglare layer. Generally, in an antireflection multilayer having a structure including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and the spectral reflection characteristics also can be made even (flat) in the visible light range. Since each layer of the thin optical film must be precise in thickness, a dry process such as vacuum deposition, sputtering, or CVD is generally used to form each layer.

Further, in order to prevent adhesion of contaminant and improve properties to easily remove adherent contaminant, it is preferable that a contamination preventive film formed of a silane compound having a fluorine group, an organic compound having the same, or the like is stacked on the antireflection layer.

With respect to the hard-coated antiglare film of the present invention, it is preferable that at least one of the transparent plastic film substrate and the hard-coating antiglare layer be subjected to surface treatment. When the transparent plastic film substrate is subjected to the surface treatment, adhesion thereof to the hard-coating antiglare layer, the polarizer, or the polarizing plate further improves. When the hard-coating antiglare layer is subjected to the surface treatment, adhesion thereof to the antireflection layer, the polarizer, or the polarizing plate further improves.

In a hard-coated antiglare film including the transparent plastic film substrate and the hard-coating antiglare layer formed on one surface of the transparent plastic film substrate, in order to prevent curling, the other surface may be subjected to solvent treatment or a transparent resin layer may be formed on the other surface.

The transparent plastic film substrate side of the hard-coated antiglare film of the present invention is generally bonded to an optical component for use in a LCD with a pressure-sensitive adhesive or an adhesive. Before bonding, the transparent plastic film substrate surface may be subjected to various types of surface treatment as described above.

The optical component can be, for example, a polarizer or a polarizing plate. Generally, a polarizing plate has a structure including a polarizer and a transparent protective film formed on one or both surfaces of the polarizer. If the transparent protective films are formed on both surfaces of the polarizer, respectively, the front and rear transparent protective films may be formed of the same material or different materials. Polarizing plates are generally disposed on both sides of a liquid crystal cell. Furthermore, polarizing plates are disposed such that the absorption axes of two polarizing plates are substantially perpendicular to each other.

Next, an optical component including a hard-coated antiglare film of the present invention stacked therein is described using a polarizing plate as an example. The hard-coated antiglare film of the present invention and a polarizer or polarizing plate can be stacked together with an adhesive or a pressure-sensitive adhesive and thereby a polarizing plate having the function according to the present invention can be obtained.

The polarizer is not particularly limited and various types can be used. Examples of the polarizer include: a film that is uniaxially stretched after a hydrophilic polymer film, such as a polyvinyl alcohol type film, a partially formalized polyvinyl alcohol type film, or an ethylene-vinyl acetate copolymer type partially saponified film, is allowed to adsorb dichromatic substances such as iodine or a dichromatic dye; and a polyene type oriented film, such as a dehydrated polyvinyl alcohol film or a dehydrochlorinated polyvinyl chloride film.

Preferably, the transparent protective film formed on one or both surfaces of the polarizer is superior in, for example, transparency, mechanical strength, thermal stability, moisture-blocking properties, and retardation value stability. Examples of the material for forming the transparent protective film include the same materials as those used for the aforementioned transparent plastic film substrate.

The polymer films described in JP 2001-343529 A (WO01/37007) also can be used as the transparent protective film. The polymer film can be produced by extruding the resin composition in the form of a film. The polymer film has a small retardation and a small photoelastic coefficient and thus can eliminate defects such as unevenness due to distortion when it is used for a protective film of, for example, a polarizing plate. The polymer film also has low moisture permeability and thus has high durability against moisture.

From the viewpoints of, for example, polarizing properties and durability, the transparent protective film is preferably a film made of cellulose resin such as triacetyl cellulose or a film made of norbornene resin. Examples of commercially available products of the transparent protective film include FUJITAC (product name) (manufactured by Fujifilm Corporation), ZEONOA (product name) (manufactured by Nippon Zeon Co., Ltd.), and ARTON (product name) (manufactured by JSR Corporation). The thickness of the transparent protective film is not particularly limited. It can be, for example, in the range of 1 to 500 μm from the viewpoints of strength, workability such as handling properties, and thin layer properties.

The structure of a polarizing plate with the hard-coated antiglare film stacked therein is not particularly limited. The polarizing plate may have, for example, a structure in which the transparent protective film, the polarizer, and the transparent protective film are stacked in this order on the hard-coated antiglare film, or a structure in which the polarizer and the transparent protective film are stacked in this order on the hard-coated antiglare film.

The image display of the present invention can have the same configuration as those of conventional image displays except for including a hard-coated antiglare film of the present invention. For example, LCD, can be produced by suitably assembling respective components such as a liquid crystal cell, optical components such as a polarizing plate, and, if necessary, a lighting system (for example, a backlight), and incorporating a driving circuit.

The liquid crystal display of the present invention is used for any suitable applications. Examples of the applications include office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

EXAMPLES

Next, the examples of the present invention are described together with the comparative examples. The present invention is not limited by the following examples or comparative examples. Various properties in the examples and the comparative examples described below were evaluated or measured by the following methods.

(Total Haze Value Ht)

A haze meter ("HM-150" (product name), manufactured by Murakami Color Research Laboratory) was used to measure a total haze value according to JIS K 7136 (2000 version) (haze (cloudiness)).

(Internal Haze Value Hin)

Figure 12:
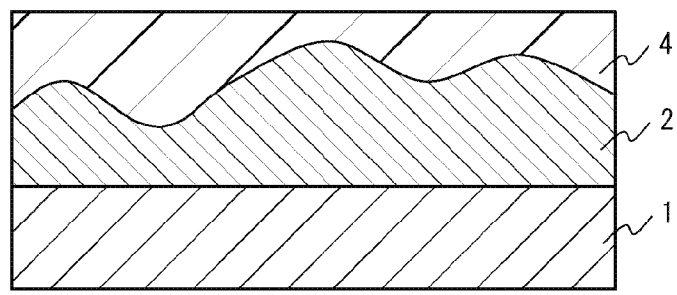
FIG. 12 is a sectional schematic drawing for explaining a method for measuring internal haze values in the examples and the comparative examples.

As shown in FIG. 12, concavities and convexities at a surface of a hard-coating antiglare layer 2 that is on a transparent plastic film substrate 1 was smoothed so that the hard-coating antiglare layer has a smooth surface 4 using a material for forming a hard-coating layer used in the examples and the comparative examples, and an internal haze value was measured in the same manner as that of the total haze value. When the material for forming a hard-coating layer contained fine particles with an average particle size of 50 nm or longer, the smooth surface 4 was formed using a resin containing no fine particles.

(External Haze Value)

External haze values were determined based on the following formula.

External haze value=Total haze value−Internal haze value (Arithmetic Average Surface Roughness Ra)

A glass sheet (with a thickness of 1.3 mm) manufactured by Matsunami Glass Ind., Ltd. was bonded to the surface of a hard-coated antiglare film on which no hard-coating antiglare layer had been formed, with a pressure-sensitive adhesive. Subsequently, the surface shape of the hard-coating antiglare layer was measured using a high-precision microfigure measuring instrument (SURFCORDER ET4000 (product name), manufactured by Kosaka Laboratory Ltd.) on the condition that a cutoff value is 0.8 mm and the arithmetic average surface roughness Ra was then determined. The high-precision microfigure measuring instrument automatically calculates the arithmetic average surface roughness Ra. The arithmetic average surface roughness Ra is indicated according to JIS B 0601 (1994 version).

(The Number of Convexities that Exceed Standard Line)

Figure 13:
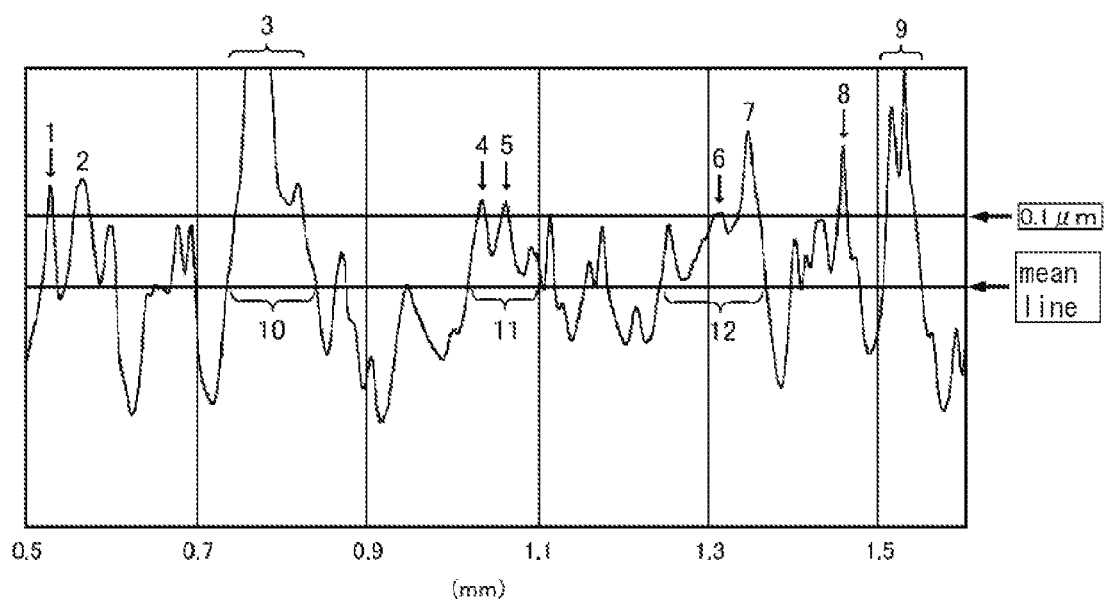
FIG. 13 is a schematic drawing for explaining a method for measuring the number of convexities in the present invention.
Figure 14:
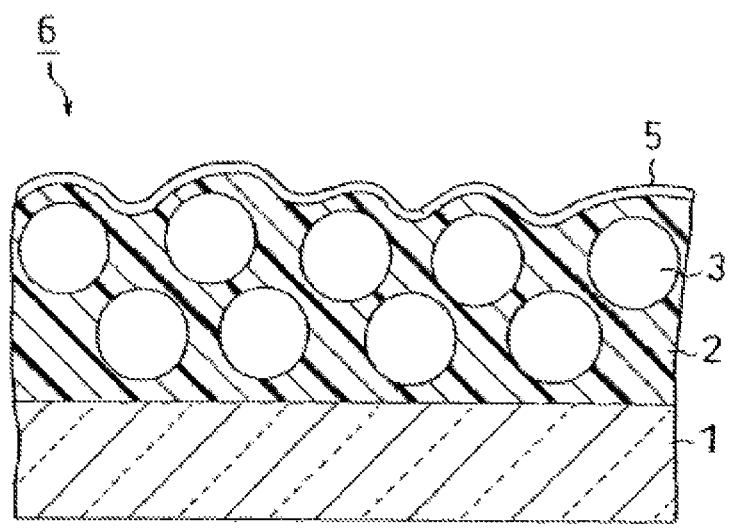
FIG. 14 is a schematic cross-sectional view showing the outline of an antiglare hard-coated film according to one embodiment of the invention.
Figure 15:
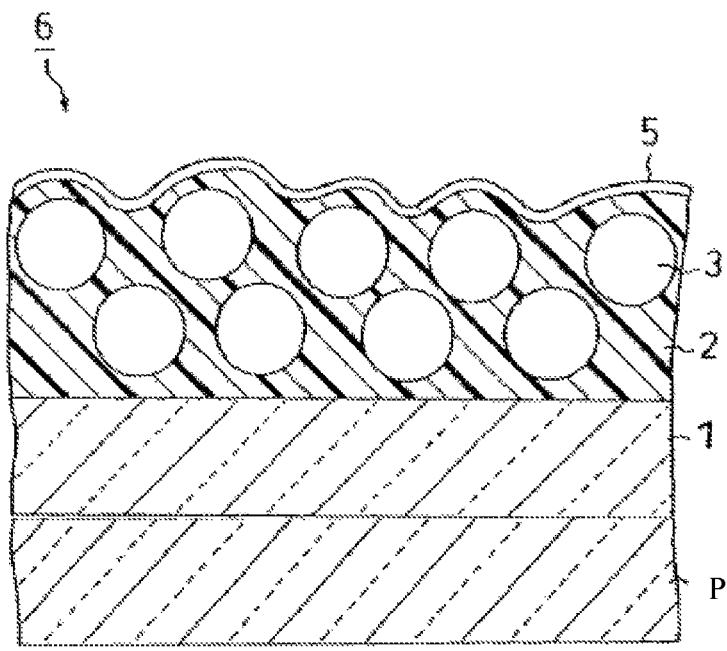
FIG. 15 is a schematic cross-sectional view showing the outline of a polarizing plate according to one embodiment of the invention.

In the roughness profile obtained through the measurement of the surface shape, the line that was in parallel with the roughness mean line of the profile and was located at a height of 0.1 µm was taken as a standard line. In a 4-mm portion of the straight line at an arbitrary measurement location, the number of convexities in which line segments of portions of the mean line that cross the convexities each have a length of 80 µm or longer, and the number of convexities in which line segments of portions of the standard line that cross the convexities each have a length of 20 µm or shorter among convexities that exceed the standard line were measured, and were used as measured values. FIG. 13 shows a schematic drawing for explaining the method for measuring the number of convexities. The convexities of 20 µm or shorter to be measured were hatched. The number of convexities to be measured was not the number of peaks but the number of portions that cross the standard line. For instance, when the profile includes a plurality of peaks in the range exceeding the standard line, such as those indicated with 3 and 9, the number of convexities to be measured is 1. In FIG. 13, the number of convexities of 80 µm or longer is 3, specifically the peaks 10, 11, and 12 in the profile, while the number of convexities of 20 µm or shorter is 5 in total, specifically peaks 1, 4, 5, 6, and 8 in the profile.

(Evaluation of Antiglare Properties)

(1) A black acrylic plate (with a thickness of 2.0 mm, manufactured by Mitsubishi Rayon Co., Ltd.) was bonded to the surface of a hard-coated antiglare film on which no hard-coating antiglare layer had been formed, with a pressure-sensitive adhesive. Thus, a sample was produced that had a back surface with no reflection.

(2) In an office environment (about 1000 Lx) where displays are used in general, the antiglare properties of the sample produced above were judged visually according to the following criteria:

AA: antiglare properties were superior to such an extent that reflected image was not observed, and the hard-coated antiglare film could be used suitably in products such as notebook PCs, which were required to have high antiglare properties, A: antiglare properties were favorable to such an extent that an edge of the image was not observed, and the hard-coated antiglare film could be used suitably in products such as notebook PCs, which were required to have high antiglare properties, and B: Although the hard-coated antiglare film had antiglare properties, an outline of the image is observed, whereby it was difficult to use the hard-coated antiglare film in products such as notebook PCs, which were required to have superior antiglare properties.

(Evaluation of White Blur)

(1) A black acrylic plate (with a thickness of 1.0 mm, manufactured by Nitto Jushi Kogyo Kabushiki Kaisha) was bonded to the surface of a hard-coated antiglare film on which no hard-coating antiglare layer had been formed, using a pressure-sensitive adhesive. Thus, a sample was produced that had a back surface with no reflection.

(2) In an office environment (about 1000 Lx) where displays are used in general, the white blur phenomenon was observed visually by viewing the display from the direction that forms an angle of 60° with the reference) (0° that is the direction perpendicular to the plane of the sample thus produced. Then evaluation was made according to the following criteria:

AA: white blur was hardly observed,

A: white blur was observed but had a small effect on visibility, and

B: strong white blur was observed and deteriorated the visibility considerably.

(Evaluation of Glare)

(1) A notebook PC ("NT-R610", with FHD (1920×1080 pixel), 16 inch, and about 140 to 150 ppi, manufactured by SAMSUNG ELECTRONICS CO., LTD.) was provided. A polarizing plate composing a panel surface of this notebook PC was of nonglare type (had no antiglare properties).

(2) a surface of the hard-coated antiglare film, on which an hard-coating antiglare layer has not been formed was bonded on the polarizing plate of the panel with white display of the notebook PC, with a pressure-sensitive adhesive. Further, glare of the hard-coated antiglare film was judged visually according to the following criteria:

AA: a level with glare but with a small effect on visibility,

A: a level with glare but with no problem in practical use, and

B: a level with considerable glare and problems in practical use.

(Refractive Indices of Transparent Plastic Film Substrate and Hard-Coating Layer)

The refractive indices of a transparent plastic film substrate and a hard-coating layer were measured with an Abbe refractometer (DR-M2/1550 (product name)) manufactured by Atago Co., Ltd. by a measuring method specified for the apparatus. The measurement was carried out, with monobromonaphthalene being selected as an intermediate liquid, and with measuring light being allowed to be incident on the measuring planes of the film substrate and the hard-coating layer.

(Refractive Index of Fine Particles)

Fine particles were placed on a slide glass, and a refractive index standard solution was dropped onto the fine particles. Thereafter, a cover glass was placed thereon. Thus, a sample was prepared. The sample was observed with a microscope and thereby the refractive index of the refractive index standard solution that was obtained at the point where the profiles of the fine particles were most difficult to view at the interface with the refractive index standard solution was used as the refractive index of the fine particles.

(Weight-Average Particle Size of Fine Particles)

By the Coulter counting method, the weight average particle size of the fine particles was measured. Specifically, a particle size distribution measurement apparatus (COULTER MULTISIZER (product name), manufactured by Beckman Coulter, Inc.) using a pore electrical resistance method was employed to measure electrical resistance of an electrolyte corresponding to the volume of the fine particles when the fine particles passed through the pores. Thus, the number and volume of fine particles were measured and then the weight average particle size thereof was calculated.

(Thickness of Hard-Coated Antiglare Layer)

A thickness gauge of a microgauge type manufactured by Mitutoyo Corporation was used to measure the total thickness of the hard-coated antiglare film. The thickness of the transparent plastic film substrate was subtracted from the total thickness. Thus, the thickness of the hard-coating antiglare layer was calculated.

Example 1

Provided was a material for forming a hard-coating layer ("OPSTAR Z7540" (product name), manufactured by JSR Corporation, solid content: 56% by weight, and solvent: butyl acetate/methyl ethyl ketone (MEK)=76/24 (weight ratio)) containing the component (A), in which silica nanoparticles (the aforementioned component (B)) formed by binding between inorganic oxide particles and an organic compound having a polymerizable unsaturated group were dispersed. The material for forming a hard-coating layer contains: the component (A): dipentaerythritol and isophorone diisocyanate polyurethane; and the component (B): silica fine particles (with a weight average particle size of 100 nm or shorter) whose surfaces are modified by an organic molecule, which satisfy component (A) in total:component (B)=2:3 (weight ratio). The cured film formed of the material for forming a hard-coating layer had a refractive index of 1.485. 10 parts by weight of cross-linked acryl-styrene particles ("TECHPOLYMER SSX1055QXE" (product name), with a weight average particle size of 5.5 μm and a refractive index of 1.515, manufactured by Sekisui Plastics Co., Ltd.) used as the fine particles, 0.1 part by weight of leveling agent ("GRANDIC PC-4100" (product name), manufactured by DIC Corporation), and 0.5 part by weight of photopolymerization initiator ("IRGACURE 127" (product name), manufactured by Ciba Specialty Chemicals) were mixed per 100 parts by weight of resin solid content of the material for forming a hard-coating layer. This mixture was diluted so as to have a solid concentration of 45% by weight, and the butyl acetate/MEK weight ratio becomes 5/1. Thus, a material for forming a hard-coating antiglare layer was prepared.

A triacetyl cellulose film ("TD80UL" (product name), with a thickness of 80 μm and a refractive index of 1.48, manufactured by Fujifilm Corporation) was provided as a transparent plastic film substrate. The material for forming a hard-coating antiglare layer was applied onto one surface of the transparent plastic film substrate using a comma coater. Thus, an applied film was formed. Subsequently, it was heated at 100° C. for one minute and thus the applied film was dried. Thereafter, it was irradiated with ultraviolet light at an accumulated light intensity of 300 mJ/cm$^2$ using a high pressure mercury lamp and thereby the applied film was cured to form a 9-μm thick hard-coating antiglare layer. Thus, a hard-coated antiglare film of Example 1 was obtained.

Example 2

A hard-coated antiglare film of Example 2 was obtained by the same method as in Example 1 except that 12 parts by weight of the fine particles was mixed per 100 parts by weight of resin solid content of the material for forming a hard-coating layer.

Comparative Example 1

A hard-coated antiglare film of Comparative Example 1 was obtained by the same method as in Example 1 except that 8 parts by weight of the fine particles was mixed per 100 parts by weight of resin solid content of the material for forming a hard-coating layer to form 11-μm thick hard-coating antiglare layer.

Comparative Example 2

A hard-coated antiglare film of Comparative Example 2 was obtained by the same method as in Example 1 except that "TECHPOLYMER SSX105NXE" (with a weight average particle size of 5.0 μm and a refractive index of 1.505, manufactured by SEKISUI PLASTICS CO., Ltd.) was used as cross-linked acryl-styrene particles, and the amount of the cross-linked particles to be mixed was 14 parts by weight per 100 parts by weight of resin solid content of the material for forming a hard-coating layer.

Comparative Example 3

A hard-coated antiglare film of Comparative Example 3 was obtained by the same method as in Example 1 except that "TECHPOLYMER SSX105NXE" (with a weight average particle size of 5.0 μm and a refractive index of 1.505, manufactured by SEKISUI PLASTICS CO., Ltd.) was used as cross-linked acryl-styrene particles, and the amount of the cross-linked acryl-styrene particles to be mixed was 17 parts by weight per 100 parts by weight of solid resin content of the material for forming a hard-coating layer.

Comparative Example 4

An ultraviolet curable resin ("UNIDIC 17-806" (product name), manufactured by DIC Corporation, solid content: 80% by weight, solvent: butyl acetate) composed of isocyanurate triacrylate, pentaerythritol triacrylate, dipentaerythritol hexaacrylate, and isophorone diisocyanate polyurethane was provided as the material for forming a hard-coating layer. The cured film of the material for forming a hard-coating layer had a refractive index of 1.53. 0.5 parts by weight of leveling agent (MEGAFAC F-470 N" (product name), manufactured by DIC Corporation), 8 parts by weight of amorphous silica particles with a weight average particle size of 2.5 µm ("SYLOPHOBIC 702" (product name), with a refractive index of 1.46, manufactured by Fuji Silysia Chemical Ltd.), 7 parts by weight of amorphous silica particles with a weight average particle size of 1.5 µm ("SYLOPHOBIC 100" (product name), with a refractive index of 1.46, manufactured by Fuji Silysia Chemical Ltd.), and 5 parts by weight of photopolymerization initiator ("IRGACURE 184" (product name), manufactured by Ciba Specialty Chemicals) per 100 parts by weight of resin solid content of the material for forming a hard-coating layer were dissolved or dispersed in a mixed solvent (toluene:butyl acetate=85:15 (weight ratio)) so as to have a solid concentration of 38% by weight. Thus, a material for forming a hard-coating antiglare layer was prepared.

An applied film was formed by applying the material for forming a hard-coating antiglare layer onto one surface of the transparent plastic substrate using a comma coater. Subsequently, it was heated at 100° C. for one minute and thus the applied film was dried. Thereafter, it was irradiated with ultraviolet light at an accumulated light intensity of 300 mJ/cm² using a metal halide lamp and thereby the applied film was cured to form a 4.0-µm thick hard-coating antiglare layer. Thus, a hard-coated antiglare film of Comparative Example 4 was obtained.

Comparative Example 5

A hard-coated antiglare film of Comparative Example 5 was obtained by the same method as in Comparative Example 4 except that a material for forming a hard-coating antiglare layer was prepared by dissolving or dispersing 0.5 parts by weight of leveling agent (MEGAFAC F-470 N" (product name), manufactured by DIC Corporation), 8 parts by weight of amorphous silica particles with a weight average particle size of 2.5 µm ("SYLOPHOBIC 702" (product name), with a refractive index of 1.46, manufactured by Fuji Silysia Chemical Ltd.), and 5 parts by weight of photopolymerization initiator ("IRGACURE 184" (product name), manufactured by Ciba Specialty Chemicals) in a mixed solvent (toluene:butyl acetate=85:15 (weight ratio)) per 100 parts by weight of resin solid content of the same material for forming a hard-coating layer as in Comparative Example 4 so as to have a solid concentration of 38% by weight.

Comparative Example 6

A hard-coated antiglare film of Comparative Example 6 was obtained by the same method as in Example 1 except that 6 parts by weight of the same cross-linked acryl-styrene particles as in Example 1 were mixed per 100 parts by weight of resin solid content of the same material for forming a hard-coating layer as in Example 1.

Comparative Example 7

A resin ("GRANDIC PC1097" (product name), manufactured by DIC Corporation, solid content: 66% by weight) containing the following components was provided as the material for forming a hard-coating layer. The cured film formed of the material for forming a hard-coating layer had a refractive index of 1.53. 20 parts by weight of acrylic particles ("SSX-108TNL" (product name), with a weight average particle size of 8 µm and a refractive index of 1.495, manufactured by Sekisui Plastics Co., Ltd.) and 0.1 part by weight of leveling agent ("GRANDIC PC-F479" (product name), manufactured by DIC Corporation) were mixed per 100 parts by weight of resin solid content of the material for forming a hard-coating layer. This mixture was diluted using ethyl acetate so as to have a solid concentration of 55% by weight. Thus, a material for forming a hard-coating antiglare layer was prepared.

Isophorone diisocyanate urethane acrylate (100 parts by weight)

Dipentaerythritol hexaacrylate (38 parts by weight)

Pentaerythritol tetraacrylate (40 parts by weight)

Pentaerythritol triacrylate (15.5 parts by weight)

Polymer or copolymer having repeating units represented by the following general formula (1), or a mixture of the polymer and copolymer (30 parts by weight)

Photopolymerization initiator: 1.8 parts by weight of "IRGACURE 184" (product name, manufactured by Ciba Specialty Chemicals) and 5.6 parts by weight of Lucirin type photopolymerization initiator Mixed solvent:butyl acetate:ethyl acetate=3:4 (weight ratio)

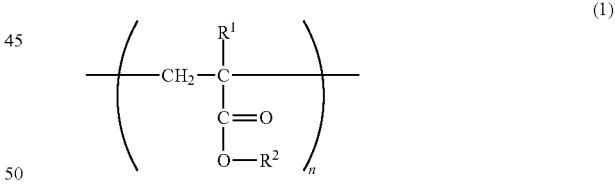

(1)

In formula (1), $R^1$ denotes —H or —$CH_3$, $R^2$ denotes —$CH_2CH_2OX$ or a group that is represented by the following general formula (2), and X denotes —H or an acryloyl group that is represented by the following general formula (3).

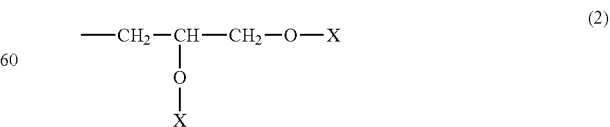

(2)

In general formula (2), X denotes —H or an acryloyl group that is represented by the following general formula (3), and the Xs may be identical to or different from each other.

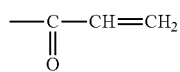

(3)

The material for forming a hard-coating antiglare layer was applied onto one surface of the transparent plastic film substrate using a comma coater. Thus, an applied film was formed. Subsequently, it was heated at 100° C. for one minute and thus the applied film was dried. Thereafter, it was irradiated with ultraviolet light at an accumulated light intensity of 300 mJ/cm² using a high pressure mercury lamp and thereby the applied film was cured to form a 24-μm thick hard-coating antiglare layer. Thus, a hard-coated antiglare film of Comparative Example 7 was obtained.

Comparative Example 8

As a material for forming a hard-coating layer, "UNIDIC 17-806" (product name) was provided. A material for forming a hard-coating antiglare layer was prepared by dissolving or dispersing 0.5 parts by weight of leveling agent ("DEFENSA MCF 323" (product name), manufactured by DIC Corporation), 14 parts by weight of polystyrene particles ("CHEMISNOW SX350H" (product name), with a weight average particle size of 3.5 μm and a refractive index of 1.59, manufactured by Soken Chemical & Engineering Co., Ltd.), and 5 parts by weight of photopolymerization initiator ("IRGACURE 184" (product name), manufactured by Ciba Specialty Chemicals) in a mixed solvent (toluene:butyl acetate:ethyl acetate=86.5:1.0:12.5 (weight ratio)) so as to have a solid concentration of 45% by weight per 100 parts by weight of resin solid content of the material for forming a hard-coating layer. Thus, a material for forming a hard-coating antiglare layer was prepared.

An applied film was formed by applying the material for forming a hard-coating antiglare layer onto one surface of the transparent plastic film substrate using a comma coater. Subsequently, it was heated at 100° C. for one minute and thus the applied film was dried. Thereafter, it was irradiated with ultraviolet light at an accumulated light intensity of 300 mJ/cm² using a metal halide lamp and thereby the applied film was cured to form a 5.0-μm thick hard-coating antiglare layer. Thus, a hard-coated antiglare film of Comparative Example 8 was obtained.

Comparative Example 9

A hard-coated antiglare film of Comparative Example 9 was obtained by the same method as in Comparative Example 8 except that 10 parts by weight of "TECHPOLYMER XX94AA" (with a weight average particle size of 6.0 μm and a refractive index of 1.495, manufactured by SEKISUI PLASTICS CO., Ltd.) that is cross-linked acryl-styrene particles used as the fine particles was mixed to form a 9-μm thick hard-coating antiglare layer.

With respect to each hard-coated antiglare film of Examples 1 and 2 and Comparative Examples 1 to 9 thus obtained, various properties were measured or evaluated. The results are indicated in FIGS. 1 to 11 and Table 1 below.

TABLE 1

| | Thickness of HC film (μm) | Particle size (μm) | The number of parts | Difference in refractive index | Total haze (%) | External haze (%) | Internal haze (%) | Hin/Ht | Ra (μm) | The number of convexities 20 μm or shorter | The number of convexities 80 μm or longer | Antiglare properties | White Blur | Glare |
|---|---|---|---|---|---|---|---|---|---|---|---|---|---|---|
| Ex. 1 | 9 | 5.5 | 10 | 0.03 | 25 | 9 | 16 | 0.64 | 0.13 | 92 | 0 | A | AA | A |
| Ex. 2 | 9 | 5.5 | 12 | 0.03 | 30 | 12 | 18 | 0.60 | 0.15 | 84 | 0 | AA | A | AA |
| Comp. Ex. 1 | 11 | 5.5 | 8 | 0.03 | 20 | 5 | 15 | 0.75 | 0.11 | 44 | 1 | A | A | B |
| Comp. Ex. 2 | 9 | 5.0 | 14 | 0.02 | 24 | 13 | 11 | 0.46 | 0.19 | 85 | 0 | AA | A | B |
| Comp. Ex. 3 | 9 | 5.0 | 17 | 0.02 | 30 | 19 | 11 | 0.37 | 0.22 | 99 | 0 | AA | A | B |
| Comp. Ex. 4 | 4 | 2.5/1.5 | 8/7 | 0.07 | 24 | 20 | 4 | 0.17 | 0.34 | 83 | 0 | AA | B | B |
| Comp. Ex. 5 | 4 | 2.5 | 8 | 0.07 | 12 | 10 | 2 | 0.17 | 0.20 | 68 | 0 | AA | B | B |
| Comp. Ex. 6 | 9 | 5.5 | 6 | 0.03 | 14 | 4 | 10 | 0.71 | 0.09 | 71 | 0 | B | AA | A |
| Comp. Ex. 7 | 24 | 8.0 | 20 | 0.04 | 22 | 4 | 18 | 0.82 | 0.10 | 23 | 7 | A | AA | B |
| Comp. Ex. 8 | 5 | 3.5 | 14 | 0.06 | 45 | 13 | 32 | 0.71 | 0.18 | 47 | 1 | AA | B | AA |
| Comp. Ex 9 | 5 | 6.0 | 10 | 0.04 | 11 | 5 | 6 | 0.55 | 0.16 | 58 | 1 | AA | B | B |

As shown in Table 1, the examples showed favorable results in all of antiglare properties, glare and white blur. On the other hand, the comparative examples showed favorable results in some of antiglare properties, glare, and white blur, but not in all of them. That is, from Comparative Examples 1, 7, and 9, it is proved that when the hard-coated antiglare film includes convexities in which the line segments each have a length of 80 μm or longer, glare properties are not favorable. From Comparative Example 8, it is proved that although each hard-coated antiglare film includes convexities in which the line segments each have a length of 80 μm or longer, a total haze value is 45%, that is extremely high. Thus, although the glare is suppressed, white blur is considerable. When the total haze value is about 45%, a decrease in contrast generates. In Comparative Examples 2 to 5, each ratio of the internal haze value to the total haze value was low. That is, since effect of inner scatter is small, favorable glare properties cannot be obtained. In Comparative Example 6, sufficient antiglare properties were not obtained, and it can be presumed that this is caused by the Ra that is small. By determining the Ra, the number of convexities, and the haze value, which are defined in the present invention, it becomes possible to understand a tendency of visibility such as antiglare properties, glare, and white blur without performing visual evaluation of the hard-coated antiglare film.

FIGS. 1 to 11 show the profiles of the sectional surface shapes of the hard-coated antiglare films obtained in the aforementioned examples and comparative examples. As compared to the hard-coated antiglare films obtained in the comparative examples, each of the hard-coated antiglare films obtained in the examples is in a condition where the whole is not rough but fine concavities and convexities are present sparsely and further no local large convexities (with a length of the line segment of 80 μm or longer) exist. It can be understood that hard-coated antiglare films with surface unevenness shapes like those of the examples are within the range defined by the aforementioned Ra and the size and number of the convexities, and furthermore, satisfy the predetermined haze value and thereby can be used suitably as hard-coated antiglare films.

Industrial Applicability

The hard-coated antiglare film of the present invention makes it possible to solve all the contradictory problems in improving contrast, ensuring antiglare properties, preventing white blur, and providing high definition. Accordingly, the hard-coated antiglare film of the present invention can be used suitably, for example, for optical elements such as polarizing plates as well as liquid crystal panels and image displays such as LCDs. It has no limitation in application and is applicable across a wide field. Furthermore, measurements of the Ra and the number of convexities, which are defined in the present invention, also makes it possible to understand the tendency of visibility such as antiglare properties, glare, and white blur without performing visual evaluation. Thus, they also are effective as indices for evaluating an antiglare film.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hard-coated antiglare film, comprising:
  a transparent plastic film substrate; and
  a hard-coating antiglare layer containing fine particles, on at least one surface of the transparent plastic film substrate, wherein
  the amount of fine particles is in the range of 10 to 20 parts by weight, per 100 parts by weight of a material for forming a hard-coating layer,
  the hard-coated antiglare film has a total haze value Ht in a range of 10% to 35%,
  the total haze value Ht and an internal haze value Hin satisfy an relationship expressed by the following formula (1),
  a surface of the hard-coating antiglare layer has an uneven shape and the following arithmetic average surface roughness Ra in a range of 0.1 to 0.3 μm, and
  the hard-coated antiglare film includes: convexities that exceed a roughness mean line of a surface roughness profile; no convexities in which line segments of portions of the mean line that cross the convexities each have length of 80 μm or longer; convexities that exceed a standard line that is in parallel with the mean line and is located at a height of 0.1 μm; and at least 50 convexities in which line segments of portions of the standard line that cross the convexities each have a length of 20 μm or shorter in a 4-mm long portion at an arbitrary location of the surface of the hard-coating antiglare layer, $$0.5 \leq Hin/Ht \leq 0.9 \tag{1}$$

Total haze value Ht: a haze value (cloudiness) (%) of an entire hard-coated antiglare film, according to JIS K 7136 (2000 version), Internal haze value Hin: a haze value (%) of the entire hard-coated antiglare film measured in the case where a surface of the hard-coated antiglare film is smooth, Ra: an arithmetic average surface roughness (μm) defined in JIS B 0601 (1994 version).

2. The hard-coated antiglare film according to claim 1, wherein the hard-coating antiglare layer is formed using the fine particles and the material for forming a hard-coating layer, which contains the following components (A) and (B):
  the component (A): a curable compound having at least one of an acrylate group and a methacrylate group, and
  the component (B): particles with a weight-average particle size of 200 nm or shorter, which are formed by binding between inorganic oxide particles and an organic compound having a polymerizable unsaturated group.

3. The hard-coated antiglare film according to claim 2, wherein in the component (B), the inorganic oxide particles include particles of at least one type selected from the group consisting of silicon oxide, titanium oxide, aluminum oxide, zinc oxide, tin oxide, and zirconium oxide.

4. The hard-coated antiglare film according to claim 2, wherein the material for forming a hard-coating layer contains the component (B) in a range of 100 to 200 parts by weight per 100 parts by weight of the component (A).

5. The hard-coated antiglare film according claim 1, wherein
  a difference in refractive index between the material for forming a hard-coating layer and the fine particles is in a range of 0.01 to 0.04, and
  the hard-coating antiglare layer contains at least one type of spherical and amorphous fine particles, each of which have a weight average particle size in a range of 0.5 to 8 μm as the fine particles.

6. The hard-coated antiglare film according to claim 1, wherein the hard-coating antiglare layer has a thickness in a range that is 1.2 to 3 times weight average particle size of the fine particles.

7. The hard-coated antiglare film according to claim 1, further comprising:
  an antireflection layer formed on the hard-coating antiglare layer.

8. A polarizing plate, comprising:
  the hard-coated antiglare film according to claim 1; and
  a polarizer.

9. An image display, comprising:
  the hard-coated antiglare film according to claim 1.

10. An image display, comprising:
  the polarizing plate according to claim 8.

11. A method for producing the hard-coated antiglare film according to claim 1, comprising:
  providing a material for forming a hard-coating antiglare layer, which contains fine particles,
  a material for forming a hard-coating layer, which contains the following component (A) and component (B), and
  a solvent;
  forming a film by applying the material for forming a hard-coating antiglare layer onto at least one surface of a transparent plastic film substrate; and
  forming a hard-coating antiglare layer by curing the film, wherein
  the fine particles are added in a range of 10 to 20 parts by weight per 100 parts by weight of the material for forming a hard-coating layer,
  a mixed solvent of butyl acetate and methyl ethyl ketone (MEK) is used as the solvent, and a ratio of butyl acetate to MEK in the mixed solvent is in a range of 1.5/1 to 6.0/1 as a weight ratio Component (A): a curable compound having at least one of an acrylate group and a methacrylate group, Component (B): particles with a weight-average particle size of 200 nm or shorter, which are formed by binding between inorganic oxide particles and an organic compound having a polymerizable unsaturated group.

12. A method for producing the hard-coated antiglare film according to claim 1, comprising:
providing a material for forming a hard-coating antiglare layer, which contains fine particles,
a material for forming a hard-coating layer, which contains the following component (A) and component (B), and
a solvent;
forming a film by applying the material for forming a hard-coating antiglare layer onto at least one surface of a transparent plastic film substrate; and
forming a hard-coating antiglare layer by curing the film, wherein
the fine particles are added in a range of 10 to 20 parts by weight per 100 parts by weight of the material for forming a hard-coating layer,
a mixed solvent of methyl isobutyl ketone (MIBK) and methyl ethyl ketone (MEK) is used as the solvent, and
a ratio of MIBK to MEK in the mixed solvent is in a range of 1.5/1 to 6.0/1 as a weight ratio Component (A): a curable compound having at least one of an acrylate group and a methacrylate group, Component (B): particles with a weight-average particle size of 200 nm or shorter, which are formed by binding between inorganic oxide particles and an organic compound having a polymerizable unsaturated group.

13. A method for evaluating a hard-coated antiglare film, comprising:
evaluating visibility of a hard-coated antiglare film using:
a total haze value Ht, an internal haze value Hin, and a arithmetic average surface roughness Ra of a surface of the hard-coated antiglare film having an uneven shape, which are defined below;
a size and the number of convexities that exceed a roughness mean line of a surface roughness profile in a 4-mm long portion at an arbitrary location of the surface of the hard-coated antiglare film; and
a size and the number of convexities that exceed a standard line that is in parallel with the mean line and is located at a height of 0.1 µm, assuming that the total haze value Ht of the hard-coated antiglare film is in a range of 10% to 35%

Total haze value Ht: a haze value (cloudiness) (%) of an entire hard-coated antiglare film, according to JIS K 7136 (2000 version), Internal haze value Hin: a haze value (%) of the entire hard-coated antiglare film measured in the case where a surface of the hard-coated antiglare film is smooth, Ra: an arithmetic average surface roughness (µm) defined in JIS B 0601(1994 version).

14. The method for evaluating a hard-coated antiglare film according to claim 13, wherein
the hard-coated antiglare film is evaluated as acceptable when the Ht and the Hin satisfy a relationship expressed by the following formula (1), the Ra is in a range of 0.1 to 0.3 µm, the hard-coated antiglare film includes no convexities in which line segments of portions of the mean line that cross the convexities each have a length of 80 µm or longer, and includes at least 50 convexities in which line segments of portions of the standard line that cross the convexities each have a length of 20 µm or shorter.

* * * * *